US010861334B2

(12) United States Patent
Torres

(10) Patent No.: US 10,861,334 B2
(45) Date of Patent: Dec. 8, 2020

(54) SYSTEM AND METHOD FOR MONITORING OCCUPANCY AT EACH OF A PLURALITY OF LOCATIONS

(71) Applicant: RUMBO MOBILE INC., Montreal (CA)

(72) Inventor: German Torres, Montreal (CA)

(73) Assignee: RUMBO MOBILE INC., Montreal (CA)

(*) Notice: Subject to any disclaimer, the term of this patent is extended or adjusted under 35 U.S.C. 154(b) by 0 days.

(21) Appl. No.: 16/467,628

(22) PCT Filed: Dec. 8, 2017

(86) PCT No.: PCT/CA2017/051487
§ 371 (c)(1),
(2) Date: Jun. 7, 2019

(87) PCT Pub. No.: WO2018/102929
PCT Pub. Date: Jun. 14, 2018

(65) Prior Publication Data
US 2020/0090515 A1 Mar. 19, 2020

Related U.S. Application Data

(60) Provisional application No. 62/432,205, filed on Dec. 9, 2016.

(51) Int. Cl.
G08G 1/14 (2006.01)
G01S 15/04 (2006.01)
(Continued)

(52) U.S. Cl.
CPC .............. G08G 1/14 (2013.01); G01S 15/04 (2013.01); G06K 9/00832 (2013.01); G08G 1/04 (2013.01)

(58) Field of Classification Search
CPC .. G06Q 20/145; G06Q 30/02; G06Q 20/3278; G01S 15/04; G07F 17/24;
(Continued)

(56) References Cited

U.S. PATENT DOCUMENTS 6,078,272 A * 6/2000 Jacobs ................ G07F 17/246
340/693.12
7,019,670 B2 * 3/2006 Bahar ................. G06Q 20/127
340/932.2

(Continued)

FOREIGN PATENT DOCUMENTS

WO 2012154913 A2 12/2012
WO 2014147524 9/2014

OTHER PUBLICATIONS

International Search Report and Written Opinion issued in corresponding PCT Application No. PCT/CA/2017/051487, dated Feb. 19, 2018.

(Continued)

Primary Examiner — Hoi C Lau
(74) Attorney, Agent, or Firm — Andrus Intellectual Property Law, LLP

(57) ABSTRACT

An occupancy monitoring device includes an occupancy sensor for detecting occupancy of a physical location by an object, a communication submodule for transmitting a wireless communication mode of a status of the detected occupancy and an unique identifier of the occupancy monitoring module, and a battery powering the occupancy sensor and the communication submodule. Components may be housed in an enclosure that is further attachable to a permanently fixed element. An occupancy monitoring system includes a plurality of the occupancy monitoring devices being deployed to monitoring occupancy of locations. Status and ID messages transmitted from the occupancy monitoring devices and receivable a user device, thereby allowing (Continued)

displaying a graphically representation of locations that are occupied and locations that are unoccupied.

18 Claims, 22 Drawing Sheets

(51) Int. Cl.
*G06K 9/00* (2006.01)
*G08G 1/04* (2006.01)

(58) Field of Classification Search
CPC .......... H04W 4/70; G07C 1/30; G08G 1/144; G08G 1/142; G08G 1/147; G08G 1/14; G08G 1/04
See application file for complete search history.

(56) References Cited

U.S. PATENT DOCUMENTS

| | | | | |
|---|---|---|---|---|
| 7,714,742 B1* | 5/2010 | Noworolski | ............. | G08G 1/14 340/531 |
| 8,600,786 B2* | 12/2013 | Stefik | ............. | G07B 15/02 705/5 |
| 8,671,002 B2* | 3/2014 | Stefik | ............. | G06Q 50/265 705/5 |
| 8,730,062 B2* | 5/2014 | Eldershaw | ............. | G08G 1/147 340/521 |
| 8,816,879 B2* | 8/2014 | Stefik | ............. | G08G 1/14 340/425.5 |
| 9,087,453 B2* | 7/2015 | Krivacic | ............. | G06Q 10/02 |
| 9,123,184 B2* | 9/2015 | Jones | ............. | G06Q 20/145 |
| 9,213,957 B2* | 12/2015 | Stefik | ............. | G06Q 10/08 |
| 9,415,721 B2* | 8/2016 | Subramanya | ............. | G01S 7/003 |
| 9,536,235 B2* | 1/2017 | Jones | ............. | H04W 4/70 |
| 9,697,506 B2* | 7/2017 | Jones | ............. | G07C 1/30 |
| 9,779,365 B2* | 10/2017 | Smullin | ............. | G06Q 10/02 |
| 10,032,150 B2* | 7/2018 | Jones | ............. | G08G 1/141 |
| 10,121,172 B2* | 11/2018 | Hudson | ............. | G06Q 30/0284 |
| 10,299,018 B1* | 5/2019 | King | ............. | H02J 7/35 |
| 10,491,972 B2* | 11/2019 | King | ............. | H04Q 9/00 |
| 10,546,495 B2* | 1/2020 | Stefik | ............. | G08G 1/142 |
| 2002/0111768 A1* | 8/2002 | Ghorayeb | ............. | G07B 15/02 702/178 |
| 2003/0112151 A1* | 6/2003 | Chauvin | ............. | G06Q 20/3552 340/870.02 |
| 2009/0267732 A1* | 10/2009 | Chauvin | ............. | G06Q 20/32 340/5.53 |
| 2010/0007525 A1 | 1/2010 | Shanbhag et al. | | |
| 2011/0276370 A1* | 11/2011 | Agrait | ............. | G07B 15/02 705/13 |
| 2012/0095812 A1* | 4/2012 | Stefik | ............. | H04N 7/18 705/13 |
| 2012/0285790 A1* | 11/2012 | Jones | ............. | G07F 17/24 194/217 |
| 2014/0005961 A1* | 1/2014 | Hod | ............. | G01S 15/04 702/56 |
| 2014/0210646 A1* | 7/2014 | Subramanya | ............. | B61L 29/28 340/928 |
| 2014/0214499 A1* | 7/2014 | Hudson | ............. | G07B 15/02 705/13 |
| 2014/0214500 A1* | 7/2014 | Hudson | ............. | G06Q 30/0284 705/13 |
| 2015/0106172 A1* | 4/2015 | Salama | ............. | G08G 1/147 705/13 |
| 2016/0197502 A1* | 7/2016 | Waters | ............. | F21L 4/085 340/636.1 |

OTHER PUBLICATIONS

Extended European Search Report for European Patent Application No. 17877440.2, dated Jul. 23, 2020.

* cited by examiner

SYSTEM AND METHOD FOR MONITORING OCCUPANCY AT EACH OF A PLURALITY OF LOCATIONS

RELATED PATENT APPLICATION

This application is the U.S. national stage application of International Application PCT/CA2017/051487, filed Dec. 8, 2017, which international application was published on Jun. 14, 2018, as International Publication WO2018/102929 in the English language. The international application is incorporated herein by reference, in entirety. The international application claims priority to U.S. provisional patent application No. 62/432,205, filed Dec. 9, 2016, the disclosure of which is hereby incorporated by reference in its entirety.

TECHNICAL FIELD

The present disclosure generally relates to monitoring occupancy at each of a plurality of locations and communicating the occupancy information.

BACKGROUND

Poor management of locations to be occupied by an object can lead to inefficiencies, higher costs and user stress. In the context of a driver looking for a parking space, a driver can often spend a significant amount of time and distance looking for an unoccupied parking space. This time and distance lead to higher harmful emissions being released from the user's vehicle and can also increase driver stress.

For the administrator of the parking space, a parking space being unoccupied when there is a driver looking for a space means less than optimal use of the available parking spaces, which can mean lower profits. Similarly, a parking space being occupied past the amount of parking time paid for by the occupant can also lower profits.

The detecting of whether one or more locations are being occupied can greatly improve efficiency in the allocating of these locations. For example, detecting whether one or more parking spaces are currently being occupied by a vehicle can make it easier for a user to locate parking spaces that are not occupied.

Various solutions have been proposed for detecting occupancy of various locations, such as detecting the availability at each of many parking spaces. Various solutions require customized hardware, invasive installation processes and/or have high power requires.

SUMMARY OF THE INVENTION

According to one aspect, there is provided a retro-fit occupancy monitoring device comprising an occupancy sensor configured to detect the occupancy of a vehicle within a parking space, a communication submodule configured to transmit in a wireless communication mode a status of the detected occupancy and an unique location identifier of the occupancy monitoring module, a battery powering the occupancy sensor and the communication submodule, and an enclosure apparatus. The enclosure apparatus has a sealed housing portion housing the occupancy sensor, the communication submodule and the battery, and at least one attachment mechanism configured for attaching the sealed housing portion to a pre-existing parking meter.

According to another aspect, there is provided an enhanced occupancy monitoring device comprising, an occupancy sensor configured to detect the occupancy of a vehicle within a parking space, at least one environmental sensor configured for sensing an environmental condition within the environment surrounding the occupancy monitoring module, a communication submodule configured to transmit in a wireless communication mode a status of the detected occupancy, an unique location identifier of the occupancy monitoring module and the sensed environmental condition, a rechargeable battery powering the occupancy sensor and the communication submodule, at least one solar panel for recharging the battery, and a sealed enclosure housing the occupancy sensor, the at least one environmental sensor, the communication submodule and the rechargeable battery.

According to yet another aspect, there is provided a multi-location occupancy monitoring device comprising an occupancy sensor configured to detect the occupancy of a vehicle within each of a plurality of parking spaces, a communication submodule configured to transmit in a wireless communication mode, for each of the plurality of parking spaces, a status of the detected occupancy for the given parking space and an unique location identifier of the given parking space, a battery powering the occupancy sensor and the communication submodule and an enclosure apparatus. The enclosure apparatus has a sealed housing portion housing the occupancy sensor, the communication module and the battery, and at least one attachment mechanism configured for attaching the sealed housing portion to a raised source of light.

According to yet another aspect, there is provided a system for providing information relating to physical occupancy of an object at each of a plurality of discrete locations, the system comprising an occupancy monitoring module positioned at each location and associated to the location, each occupancy monitoring module having:

an occupancy sensor configured to detect the occupancy of an object at the location; and a communication submodule configured to transmit in a low-energy communication mode a status of the detected occupancy and an unique location identifier of the occupancy monitoring module; and wherein transmissions transmitted in the low-energy communication mode by the communication submodules of at least two occupancy monitoring modules are receivable at substantially the same time by a single receiving device.

According to yet another aspect, there is provided a system for providing information relating to physical occupancy of an object at each of plurality of discrete locations, the system comprising an occupancy monitoring module positioned at each location and associated to the location, each occupancy monitoring module having:

an occupancy sensor configured to detect the occupancy of an object at the location; and a communication submodule configured to transmit in a low-energy communication mode a status of the detected occupancy and an unique location identifier of the occupancy monitoring module; and a plurality of antennas, each antenna being positioned within low-energy communication range of a subset of the locations and configured to receive transmissions of statuses of detected occupancy and unique location identifiers transmitted in the low-energy communication mode by the communication submodules of each occupancy monitoring modules positioned at the subset of the locations.

According to yet another aspect, there is provided a system for providing information relating to physical occupancy of an object at each of plurality of discrete locations, the system comprising an occupancy monitoring module positioned at each location and associated to the location, each occupancy monitoring module having:

an occupancy sensor configured to detect the occupancy of an object at the location; and a communication submodule configured to transmit in a low-energy communication mode a status of the detected occupancy and an unique location identifier of the occupancy monitoring module;

a first user-operated device configured to:

receive transmissions transmitted in the low-energy communication mode by the communication submodules of at least two occupancy monitoring modules at substantially the same time; and retransmit, over a wide-area network, to a central device, the statuses of the detected occupancy and the unique location identifiers contained in the transmissions from the at least two occupancy monitoring modules; and a second user-operated device configured to receive, in the long-range communication mode, from the central device, the statuses of the detected occupancy and the unique location identifiers contained in the transmissions from the at least two occupancy monitoring modules.

According to yet another aspect, there is provided a system for providing information relating to physical occupancy of an object at each of plurality of discrete locations, the system comprising an occupancy monitoring module positioned at each location and associated to the location, each occupancy monitoring module having:

an occupancy sensor configured to detect the occupancy of an object at the location; and a communication submodule configured to transmit in a low-energy communication mode a status of the detected occupancy and an unique location identifier of the occupancy monitoring module and to receive information in the low-energy communication mode; and wherein a first of the occupancy monitoring modules is configured to:

receive the status of the detected occupancy and unique location identifier transmitted from a second occupancy monitoring module; and retransmit the status of the detected occupancy and the unique location identifier from the second occupancy monitoring module.

BRIEF DESCRIPTION OF THE DRAWINGS

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

DETAILED DESCRIPTION

Broadly described, various example embodiments described herein provide for a system and method for monitoring occupancy of an object at each of a plurality of locations and communicating the monitored occupancy.

According to example application, the plurality of locations is a plurality of parking spaces and the occupancy of an object at each location is the occupancy of an automobile in a given parking space. Information relating to which parking spaces are occupied or unoccupied is communicated to a user device, such as a smartphone or tablet. Alternatively, the user device may be an on-board information device (ex: a dashboard screen) of a vehicle driven by a user. This allows the user to quickly identify which parking spaces are unoccupied.

While the description is generally provided herein with reference to parking spaces (location) being occupied or unoccupied by an automobile (occupancy of an object at the location), it will be understood that the systems and methods described herein may be applied to other analogous or similar applications where occupancy of locations need to be monitored. In particular, such locations may be geographically dispersed, require monitoring of occupancy in real-time and/or would benefit from low power requirements.

Figure 1:
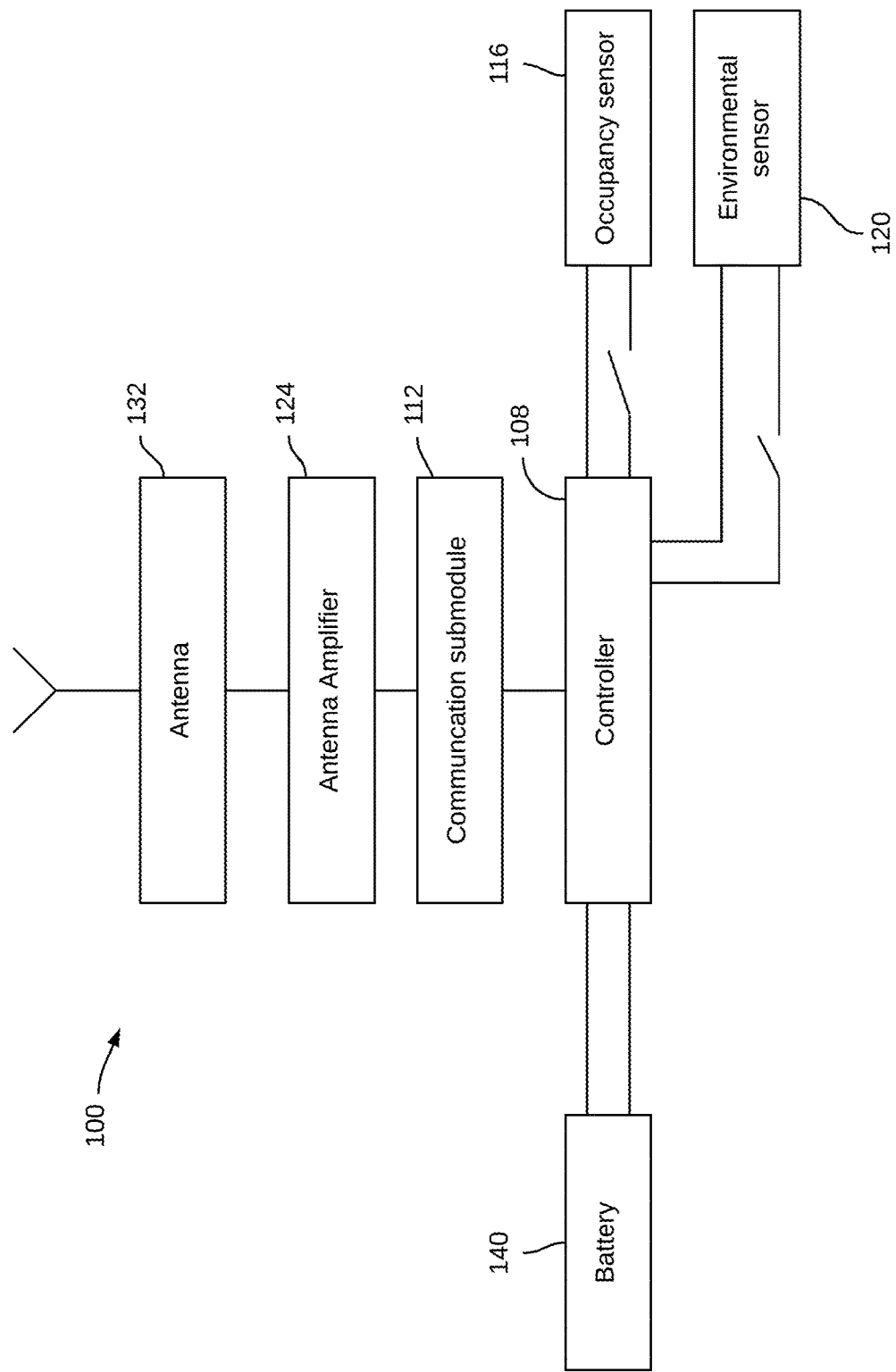
FIG. 1 illustrates a schematic diagram of the operational modules of an occupancy monitoring module according to an example embodiment.

Referring now to FIG. 1, therein illustrated is a schematic diagram of the operational modules of an occupancy monitoring module 100 according to one example embodiment.

The occupancy monitoring module 100 includes a controller submodule 108. The controller described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller submodule 108 can be configured to operate in an active mode having higher power consumption and a power-down mode having substantially lower power consumption. The controller submodule 108 can be an 8-bit microcontroller, such as the ATtiny85 micontroller by Atmel™. The controller submodule 108 can further control other components of the occupancy monitoring module 100 to operate in a high power consumption mode when the controller submodule 108 is operating in its active mode. The controller submodule 108 can also control the other components of the occupancy monitoring module 100 to operate in a power-down mode having substantially lower power consumption when the controller submodule 108 is also operating in the power-down mode.

The occupancy monitoring module 100 also includes a communication submodule 112 that is operable to communicate wirelessly. The communication module is configured to carry out the wireless communication in accordance with short range communication standards such as Wi-Fi, Bluetooth, Near Field Communication, etc.

In various example embodiments, the communication submodule is operable to transmit messages in a low-energy communication mode, such as Bluetooth Low Energy. For example, the Bluetooth Low Energy mode may have a transmission range of greater than 100 meters, and in some example embodiments, up to 500 meters.

Alternatively, or additionally, the communication submodule 112 is operable to communicate wirelessly in a long range wireless communication mode, such as mobile communication using current cellular standards (ex: 3G/4G/LTE, etc), long-range Wi-Fi or wireless personal area network standards (ex: based on IEEE 802.15.4 specification, such as Zigbee or Xbee). In the case of mobile communication using a cellular standard, the comm™. In the case of a wireless personal area network standard, the communication submodule 112 can be a long-range 900 MHz module, such as the Xbee-Pro™ 900 HP RF module from Digi™.

The controller submodule 108 of the occupancy monitoring module 100 is further operable to control a physical occupancy sensor 116. The sensor produces a signal (ex: electrical, magnetic, electromagnetic) in response to a condition, which is received at the controller submodule 108. The sensor module may further control whether the occupancy sensor 116 is turned on for sensing occupancy or turned off (ex: to save battery).

In some example embodiments, the communication submodule and a sensor submodule for controlling the sensor 116 may be implemented together with the controller module 108, such as, within an embedded system or a system-on-chip.

The occupancy sensor 116 is configured to detect the occupancy of an object in its proximity. For example, the occupancy sensor 116 may be one or more of an ultrasonic sensor, a magnetic sensor, sonar range sensor, an infra-red sensor and an image capture device. In the case of an image capture device, an infra-red sensor can be combined with the image capture device to permit image capture in low-light conditions.

According to some example embodiments, the occupancy monitoring module 100 may further include at least one environmental sensor 120 configured for sensing an environmental condition within an environment surrounding the occupancy monitoring module 100. The environmental sensor 120 can be one or more of a barometer, rainfall detector, air quality sensor, temperature sensor, humidity sensor and snow depth sensor.

The occupancy monitoring module 100 may also include one or more of the the following types of sensors, some of which may be used as an occupancy sensor 116 or an environmental sensor 120: carbon dioxide sensor, carbon monoxide detector, catalytic bead sensor, chemical field-effect transistor, chemiresistor, electrochemical gas sensor, electrolyte-insulator-semiconductor sensor, fluorescent chloride sensors, hydrogen sensor, hydrogen sulfide sensor, infrared point sensor, ion-selective electrode, nondispersive infrared sensor, nitrogen oxide sensor, pptode, oxygen sensor, ozone monitor, pellistor, pH glass electrode, potentiometric sensor, redox electrode, smoke detector, zinc oxide nanorod sensor, current sensor, Daly detector, electroscope, electron multiplier, Faraday cup, galvanometer, Hall effect sensor, Hall probe, magnetic anomaly detector, magnetometer, MEMS magnetic field sensor, metal detector, planar Hall sensor, radio direction finder, voltage detector, air flow meter, anemometer, flow sensor, gas meter, mass flow sensor, water meter, cloud chamber, Geiger counter, neutron detection, scintillation counter, air speed indicator, altimeter, attitude indicator, depth gauge, fluxgate compass, gyroscope, inertial navigation system, inertial reference unit, magnetic compass, MHD sensor, ring laser gyroscope, turn coordinator, tiaLinx sensor, variometer, vibrating structure gyroscope, yaw rate sensor, Auxanometer, capacitive displacement sensor, capacitive sensing, free fall sensor, gravimeter, gyroscopic sensor, impact sensor, inclinometer, integrated circuit piezoelectric sensor, laser rangefinder, laser surface velocimeter, LIDAR, linear encoder, linear variable differential transformer (LVDT), liquid capacitive inclinometers, odometer, photoelectric sensor, piezocapactive sensor, piezoelectric accelerometer, position sensor, rate sensor, rotary encoder, rotary variable differential transformer, selsyn, shock detector, shock data logger, stretch sensor, tilt sensor, tachometer, ultrasonic thickness gauge, variable reluctance sensor, velocity receiver, charge-coupled device, CMOS sensor, colorimeter, contact image sensor, electro-optical sensor, flame detector, infra-red sensor, kinetic inductance detector, LED as light sensor, light-addressable potentiometric sensor, Nichols radiometer, fiber optic sensors, optical position sensor, thermopile laser sensors, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, wavefront sensor, barograph, boost gauge, Bourdon gauge, hot filament ionization gauge, ionization gauge, McLeod gauge, oscillating U-tube, permanent Downhole Gauge, piezometer, Pirani gauge, pressure sensor, pressure gauge, tactile sensor, time pressure gauge, Bhangmeter, hydrometer, force gauge and force Sensor, level sensor, load cell, magnetic level gauge, nuclear density gauge, piezocapactive pressure sensor, piezoelectric sensor, strain gauge, torque sensor, viscometer, Bolometer, bimetallic strip, calorimeter, exhaust gas temperature gauge, flame detection, Gardon gauge, Golay cell, heat flux sensor, infrared thermometer, microbolometer, microwave radiometer, net radiometer, Quartz thermometer, resistance temperature detector, resistance thermometer, silicon bandgap temperature sensor, temperature gauge, thermistor, thermocouple, thermometer, pyrometer, alarm sensor, Doppler radar, motion detector, occupancy sensor, proximity sensor, passive infrared sensor, reed switch stud finder, triangulation sensor, touch switch or wired glove.

In one example embodiment, the occupancy sensor 116 is a directional narrow-beam ultrasonic sensor. This type of sensor has high distance selectivity in that it is capable of detecting, over a wide range of distances away from the sensor, the presence of an object at a precise distance away from the sensor. Accordingly, the occupancy sensor 116 is operable to adjust the distance at which it detects occupancy of an object. For example, the directional narrow-beam ultrasonic sensor can be configured to permit only determining occupancy when an object is located within a predetermined range of distances from the sensor (ex: an object being located above a first predetermined distance and below a second predetermined distance is detected as the object being present).

This directional narrow-beam ultrasonic sensor can be deployed in situations where other objects are expected to be located between the sensor and the location for which occupancy is being monitored and detection of these objects should be filtered as non-occurrences of occupancy of the location. This distance range corresponds to a distance of the sensor from the location being monitored.

This predetermined distance range can be defined by a near distance threshold (corresponding to a distance closer to the sensor) and a far distance threshold (corresponding to a distance farther from the sensor). The directional narrow-beam ultrasonic sensor provides sufficiently high distance selectivity so that an object detected at a distance closer than the near distance threshold can be determined as a non-occurrence of occupancy of the monitored location, an object detected at a distance within the predetermined distance range is determined as a positive occurrence of occupancy of the monitored location, and an object detected at a distance greater than the far distance threshold is also determined as a non-occurrence of occupancy.

The directional narrow-beam ultrasonic sensor 116 can output a variable object detection reading that includes a component indicating a distance of a detected object away from the sensor. This detection reading can be received by the controller submodule 108, whereby the controller submodule 108 determines a positive occurrence or a non-occurrence of occupancy of the location based on the received detection reading. More particularly, controller submodule 108 can be configured to determine a detected object located within the predetermined distance range from the directional narrow-beam ultrasonic sensor 116 as a positive occurrence of occupancy. Furthermore, the controller submodule 108 can be configured to determine detected objects located outside the predetermined distance range as non-occurrence of occupancy of the location.

For example, the directional narrow-beam ultrasonic sensor 116 is able to consistently detect a person within a distance range of approximately 30 cm to approximately 210 cm in a distance selective manner. The directional narrow-beam ultrasonic sensor 116 may be a MB7052-MB7092 ultrasonic range finder of the XL-MaxSonar™-WR/WRC™ Series.

In another example embodiment, the occupancy sensor 116 is a wide-beam sonar range sensor. The detection beam of the wide-beam sonar range sensor is substantially wider than the directional narrow-beam ultrasonic sensor. The wide-beam sonar range sensor also has a significantly reduced distance selectivity compared to the directional narrow-beam ultrasonic sensor in that the wide-beam sonar range sensor has a reduced capability to differentiate objects detected nearby the sensor from objects detected further away from the sensor based on the distances of the object away from the sensor. However, some distance selectivity capability is still provided.

This wide-beam sonar range sensor can be deployed in situations where objects nearby the occupancy sensor 116 are to be detected as positive occurrence of occupancy of the location. Accordingly, the wide-beam sonar range sensor can be configured to permit determining occupancy when only an object is located at a distance below a predetermined distance threshold. An object detected by the wide-beam sonar range sensor located at distance greater than the predetermined distance threshold can be determined as a non-occurrence of occupancy of the location. The wide-beam sonar range sensor 116 can output a variable object detection reading that includes a component indicating a distance of a detected object away from the sensor. This detection reading can be received by the controller submodule 108, whereby the controller submodule 108 determines a positive occurrence or a non-occurrence of occupancy of the location based on the received detection reading.

For example, the wide-beam sonar range sensor is able to consistently detect a person within a distance range of approximately 30 cm to approximately 210 cm, but does not provide a precise reading of the distance of the person within this range. The wide-beam sonar range sensor may be a MB1000 series high performance sonar range finder of the LV-MaxSonar™ Series.

In one example embodiment, the occupancy monitoring module 100 has a thermometer for sensing a temperature in the environment in proximity of the module 100. The thermometer can be embedded within the occupancy sensor 116 being the directional narrow-beam ultrasonic sensor or the wide-beam sonar range sensor. The directional narrow-beam ultrasonic sensor or the wide-beam sonar range sensor are both configured to compensate their sensitivity in response to changes in temperature. Accordingly, either of the directional narrow-beam ultrasonic sensor or the wide-beam sonar range sensor can be used outdoors where there are variable environmental conditions.

In yet another example embodiment, the occupancy sensor 116 is an ultrasonic sensor or sonar range sensor having a fixed sensitivity. That is, this type of occupancy sensor 116 does not have temperature compensation capabilities. This type of sensor may be used in climate-controlled environments, such as an indoor environment (ex: indoor or underground parking lot).

In yet another example embodiment, the occupancy sensor 116 is a magnetic sensor that is operable to detect the magnetic field changes produced by a vehicle.

The occupancy monitoring module 100 further includes an amplifier 124 and antenna 132 that are configured to cooperate to transmit an electromagnetic signal corresponding to a transmission signal generated by the communications module. Additionally, the amplifier 124 and antenna 132 cooperate to receive electromagnetic signals, which are sent to the communications submodule of the occupancy monitoring module 100.

The occupancy monitoring module 100 is a battery-powered device and includes a battery module 140 to provide power to various components of the occupancy sensor 116. In some example embodiments, the battery module 140 is a rechargeable battery and the occupancy monitoring module 100 may further include a recharging module for providing power to recharge the battery module 140. The recharging module may convert a renewable source of energy to generate the power for recharging. For example, the recharging module may be one or more solar panels.

Figure 2:
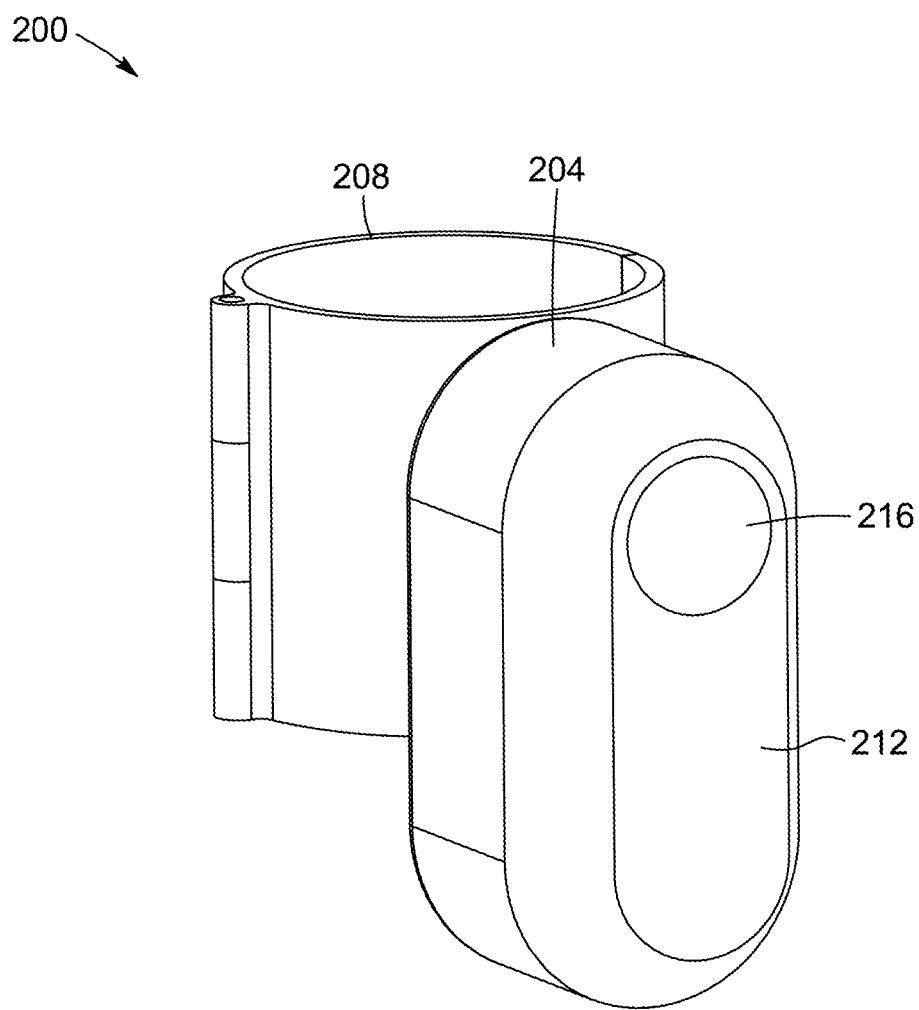
FIG. 2 illustrates a perspective view of a retro-fit occupancy monitoring device according to an example embodiment.

Referring now to FIG. 2, therein illustrated is a perspective view of a retro-fit occupancy monitoring device 200 according to one example embodiment. The retro-fit occupancy monitoring device 200 includes an enclosure apparatus having a sealed housing portion 204 and at least one attachment mechanism 208. The sealed housing portion 204 defines an inner chamber that houses components of the occupancy monitoring module 100. More particularly, each of the occupancy sensor 116, the controller 108, and the battery 140 may be housed within the sealed housing portion 204. Additionally, the antenna amplifier 124 and the antenna 132 can also be housed within the sealed housing portion 204. A front face 212 of the sealed housing portion 204 includes a signal permeable portion 216 that permits passage therethrough of probe signals generated by the occupancy sensor 116. Accordingly, probe signals generated by the occupancy sensor 116 housed within the sealed housing portion 204 of the enclosure apparatus are transmitted through the signal permeable portion 216 for detecting presence of objects in proximity of the retro-fit occupancy monitoring device 200.

The retro-fit occupancy monitoring device 200 further includes at least one attachment mechanism 208 configured for attaching the sealed housing portion 204 to a permanently fixed element. The permanently fixed element can be any element that is already affixed in permanent manner to a ground surface before attachment of the retro-fit occupancy monitoring device 200.

In the context of detecting occupancy of parking spaces, the permanently fixed element can be a roadside permanently fixed element, which can be any element located in proximity of anywhere that is accessible by a vehicle. The roadside permanently fixed element can be a man-made element, which may include, without limitation, a parking meter, a support member for a traffic sign, lamp post or a building. Additionally or alternatively, the roadside permanently fixed element can be a natural element, such as a tree.

In the example illustrated in FIG. 2, the attachment mechanism 208 is a clip configured for attaching to a roadside permanently fixed element. More particularly, the attachment mechanism has curved clip members for attachment to a permanently fixed element having a curved surface, such as the post of a parking meter having a generally elliptical cross-section.

Figure 3:
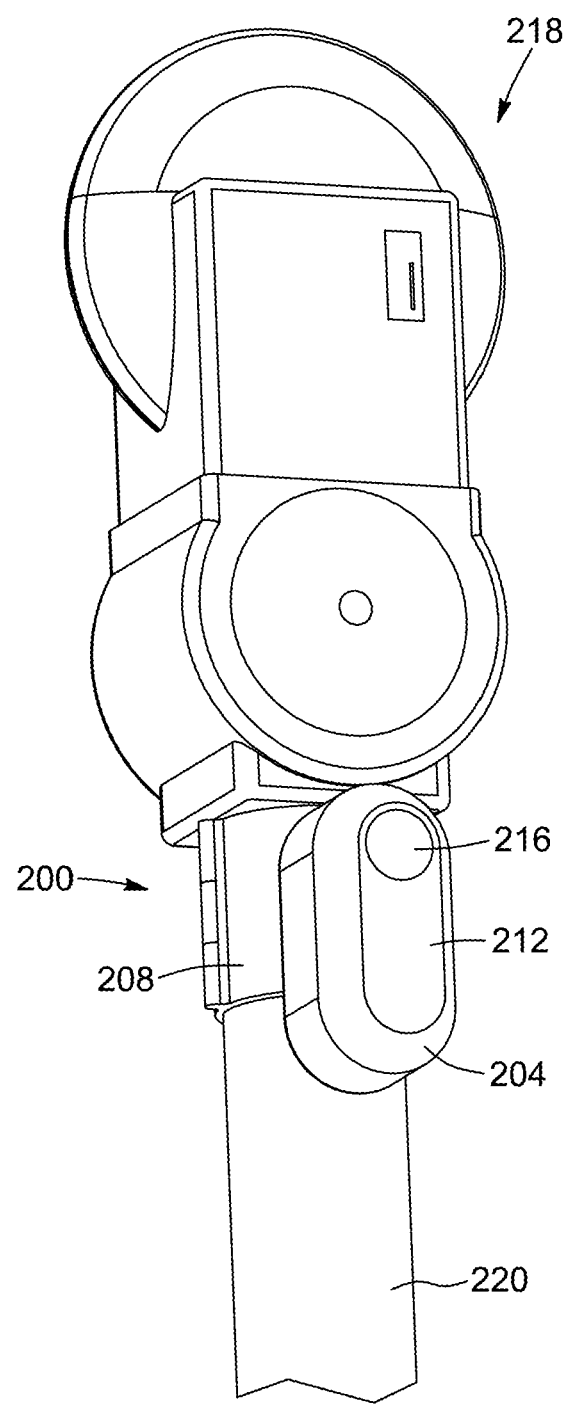
FIG. 3 illustrates a front perspective view of the retro-fit occupancy monitoring being attached to a post portion of a parking meter according to an example deployment.

FIG. 3 illustrates a front elevation view of a pre-installed parking meter 218 onto which a retro-fit occupancy monitoring device 200 has been attached. More particularly, the retro-fit occupancy monitoring device 200 is attached to a post portion 220 of the parking meter 216. It will be appreciated that the retro-fit occupancy monitoring device 200 is easily useable with existing roadside infrastructure. Moreover, since existing a parking meter are typically installed in proximity of the parking space that it serves, the parking meter provides a readily usable spot to position the occupancy monitoring device 200 in order to detect occupancy of the nearby parking space.

It will be appreciated that since the occupancy monitoring module 100 housed within the retro-fit occupancy monitoring device 200 is self-powered and uses wireless communication, it can be quickly installed in a non-invasive manner. In particular, the retro-fit occupancy monitoring device 200 can be installed without having to run any wires for supplying power or for data communication.

The retro-fit occupancy monitoring device 200 can generally be operated in an autonomous manner. However, some minor configuration of the occupancy monitoring module 100 or of a central monitoring device may be required before use of the retro-fit occupancy monitoring device 200 for occupancy monitoring, such as associating a unique identifier data entry of the occupancy monitoring module 100 with the geographical coordinates of the location being monitored by that monitoring module 100. Similarly, some minor periodic maintenance may be required, such as replacing the battery module 140 where the battery module 140 is not being recharged.

Figure 4:
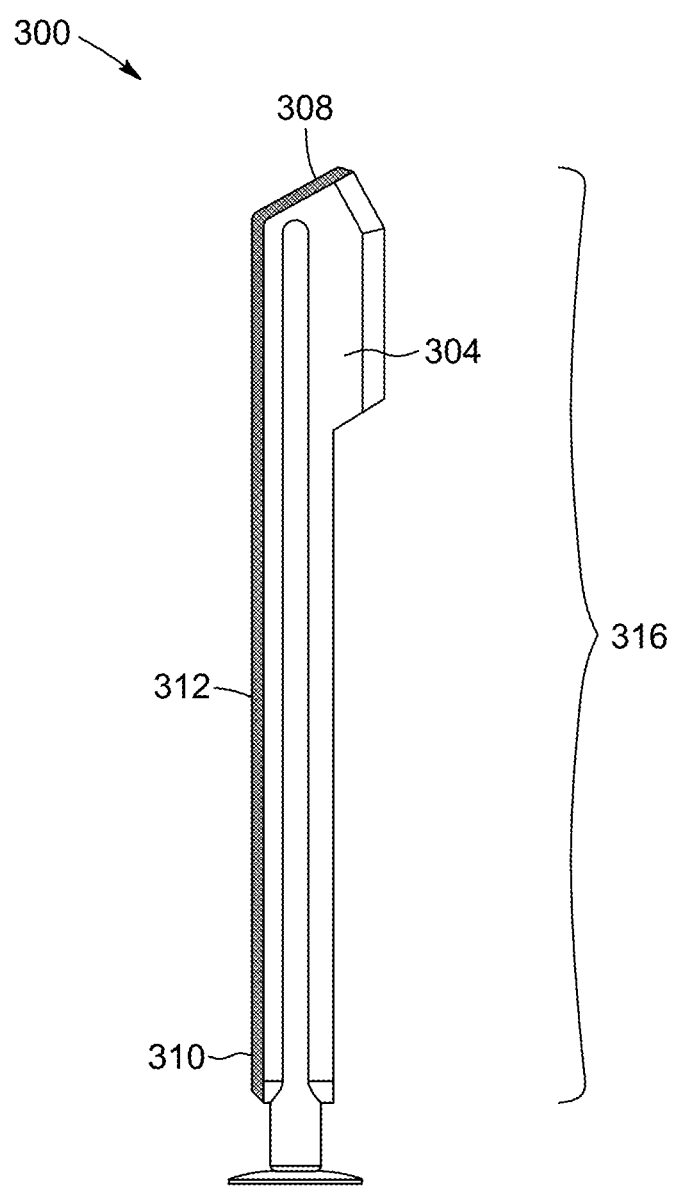
FIG. 4 illustrates a side elevation view of an enhanced occupancy monitoring device according to one example embodiment.
Figure 5:
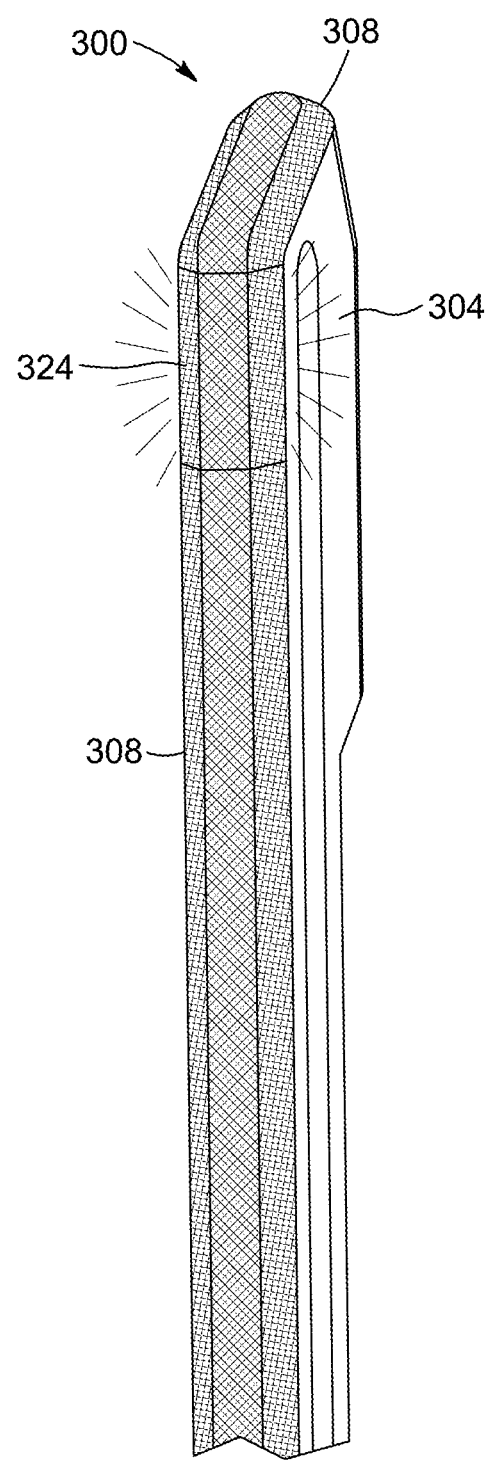
FIG. 5 illustrates a close-up view of a top portion of the enhanced occupancy monitoring device.

Referring now to FIGS. 4 and 5, therein illustrated is a side elevation view and a close-up view of an enhanced occupancy monitoring device 300 according to one example embodiment. The enhanced occupancy monitoring device 300 is for use in detecting whether a parking space is occupied and intended to replace existing parking meters. Accordingly, the enhanced occupancy monitoring device 300 can provide enhanced features over existing parking meters.

The enhanced occupancy monitoring device 300 includes a sealed enclosure body 304 that houses various electronic components of an occupancy monitoring module 100. More particularly, each of the occupancy sensor 116, the controller 108 and the battery 140 may be housed within the sealed enclosure body 304. At least one other sensor, which may be the at least one environmental sensor 120 can also be housed within the enclosure 304.

A solar panel 308 may be positioned over a front top surface of the sealed enclosure body 304 to capture solar rays that are further converted to electrical energy to recharge the battery 140.

A front face plate 312 of the enclosure body 304 may be permeable to probe signals generated by the occupancy sensor 116. Accordingly, probe signals generated by the occupancy sensor 116 housed within the sealed enclosure body 304 are transmitted through the signal permeable front face plate 312 for detecting presence of objects in proximity of the enhanced occupancy monitoring device 300.

The at least one other sensor, such as an environmental sensor 120 can also be positioned in proximity of the front face plate 312 to sense the condition of the environmental sensor 120 through the signal-permeable front face plate 312.

In one example embodiment, the signal-permeable front face plate 312 extends in an up-down direction along substantially the entire height 316 of the sealed enclosure body 304. The at least one other sensor is a snow depth sensor 120 that is positioned in a bottom region 320 of the sealed enclosure body 304 to detect build-up of snow over a ground surface on which the sealed closure body 304 is fixed. This information can further be submitted to an external service provider, such as a snow removal company, to remove the snow.

The enhanced occupancy monitoring device 300 may further include a status indicator 324. In the illustrated example, the status indicator 324 is an LED positioned in a top region of the front face plate 308 of the sealed enclosure body 304. The status indicator 324 can be used to display an utilization state of a parking space associated to a given enhanced occupancy monitoring device 300. For example, the status indicator 324 can have a first display state to indicate that the parking space is free for occupation. The status indicator 324 can have a second display state to indicate that the parking space has been reserved to inform a driver to refrain from occupying the space even though the space appears unoccupied. The status indicator 324 can further have a third display state to indicate that the parking space has been paid for, but has subsequently been freed, so that a driver can now occupy that space. As described elsewhere herein, the utilization state of a parking space can be managed by a central monitoring module. The utilization state can be transmitted from the central monitoring module and received by the communication submodule 112 of the occupancy monitoring module 100 of the enhanced occupancy monitoring device 300.

Figure 6:
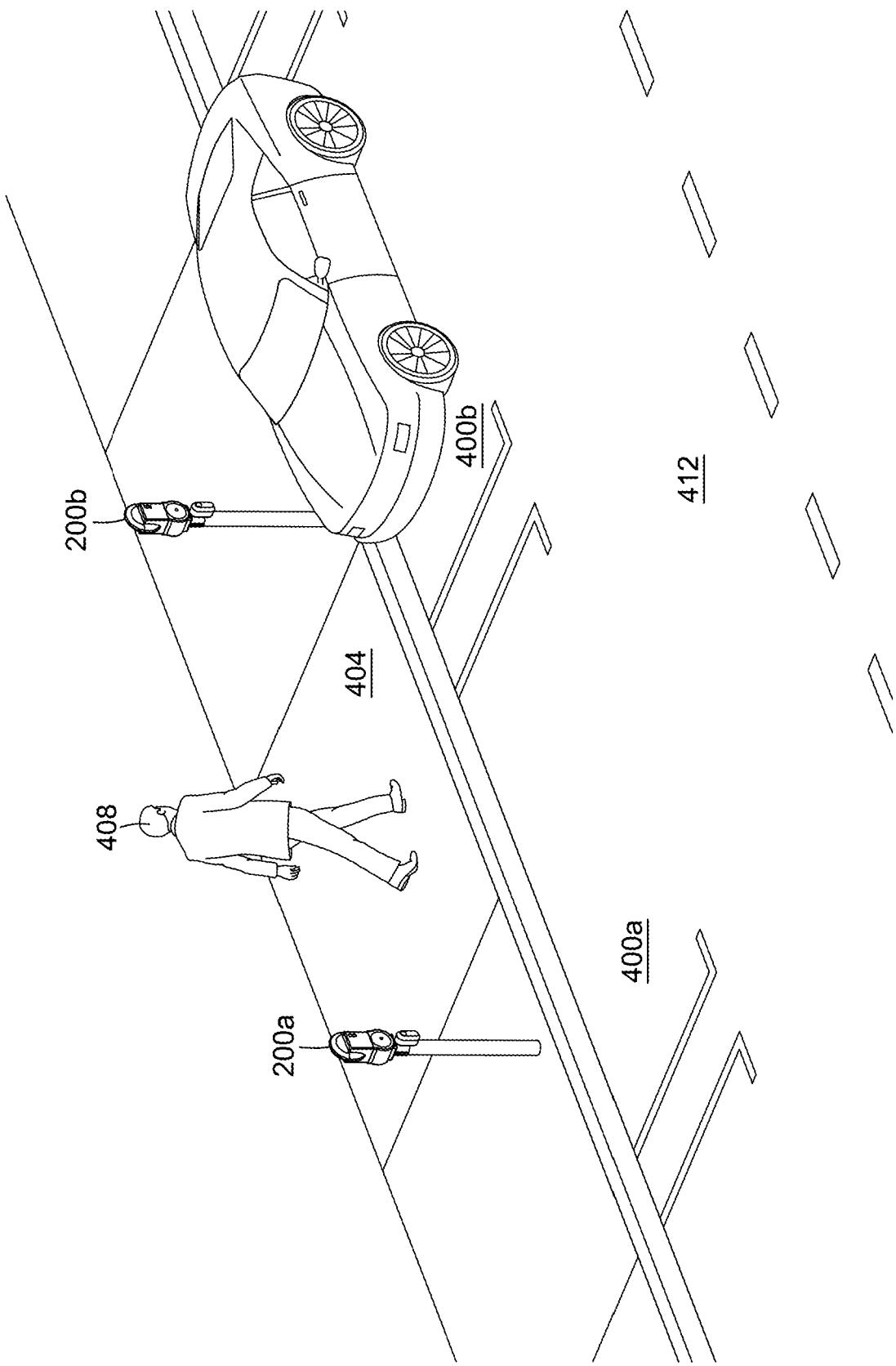
FIG. 6 illustrates a first exemplary roadside environment in which two occupancy monitoring modules contained in two retro-fit occupancy monitoring devices have been deployed.

Referring now to FIG. 6, therein illustrated is a view of a roadside environment in which two occupancy monitoring modules 100a, 100b have been deployed. The two occupancy monitoring modules 100a, 100b are illustrated as being provided within retro-fit occupancy monitoring devices 200a, 200b. However, it will be understood that the occupancy monitoring modules 100a, 100b can be provided in another form factor, such as within enhanced occupancy monitoring devices 300 described herein.

In the example illustrated FIG. 6, the first occupancy monitoring device 200a is associated with a first parking space 400a and has been deployed to monitor occupancy of that space 400a. The second occupancy monitoring device 200b is associated with a second parking space 400b and has been deployed to monitor occupancy of that space 400b. Each of the occupancy monitoring devices 200a, 200b are located in proximity of their respective parking spaces 400a, 400b. More particularly, the occupancy monitoring devices 200a, 200b are located such that it is expected that the space between the occupancy sensor 116 of each device 200a, 200b and their respective parking spaces 400a, 400b will be free (i.e. not obstructed by) any other objects.

In the illustrated example, the occupancy monitoring devices 200a, 200b are located on the edge of the sidewalk 404 immediately adjacent to the parking spaces 400a, 400b located on the side of the road. It will be appreciated that objects on the sidewalk 404, such as pedestrian 408 will typically pass behind the occupancy monitoring devices 200a, 200b, and will not obstruct the sensing of occupancy of the spaces 400a, 400b. Accordingly, the occupancy monitoring devices 200a, 200b, may each have a wide-beam sonar range sensor as described elsewhere herein as their occupancy sensor 116. Each wide-beam sonar range sensor 116 can be calibrated to detect objects within a certain distance so that the presence of a vehicle in parking space 400a, 400b can be determined as a positive occurrence of occupancy while a vehicle passing in the traffic lane 412 are determined as a non-occurrence of occupancy.

Figure 7:
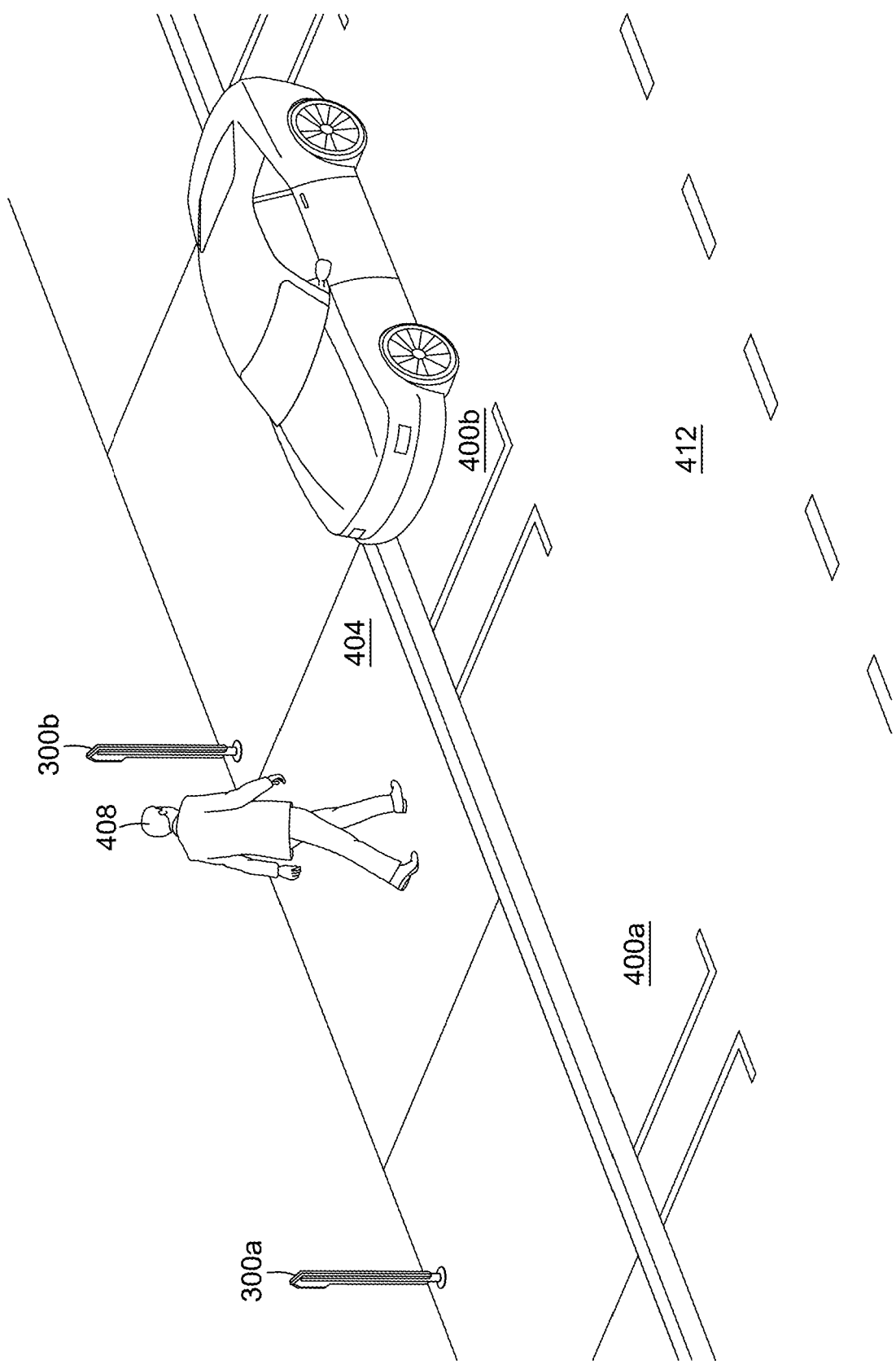
FIG. 7 illustrates a second exemplary road environment in which two occupancy monitoring modules contained in two enhanced occupancy monitoring devices have been deployed.

Referring now to FIG. 7, therein illustrated is a view of a roadside environment in which two occupancy monitoring modules have been deployed. The two occupancy monitoring modules 100a, 100b are illustrated as being provided within enhanced occupancy monitoring devices 300a, 300b. However, it will be understood that the occupancy monitoring modules 100a, 100b can be provided in another form factor, such as within retro-fit occupancy monitoring devices 200 described herein.

In the example illustrated in FIG. 7, the first occupancy monitoring device 300a is associated with the first parking space 400a and has been deployed to monitor occupancy of that space 400a. The second occupancy monitoring device 300b is associated with the second parking space 400b and has been deployed to monitor occupancy of that space 400b. Each of the occupancy monitoring devices 300a, 300b are located to be spaced apart from their respective parking spaces 400a, 400b. More particularly, the occupancy monitoring devices 300a, 300b are located such that it is expected that other objects will pass through the space between the occupancy sensor 116 of each device 300a, 300b and their respective parking spaces 400a, 400b.

In the illustrated example, the occupancy monitoring devices 300a, 300b are located on the far side of the sidewalk 404 and away from the side of the road. It will be appreciated that objects on the sidewalk 404, such as pedestrian 408, will temporarily obstruct the sensing of occupancy of the spaces 400a, 400b by the occupancy sensors 116 of each device 300a, 300b. Accordingly, the occupancy monitoring devices 200a, 200b may each have a directional narrow-beam ultrasonic sensor as described elsewhere herein as their occupancy sensor 116. Each directional narrow-beam ultrasonic sensor can be calibrated and the controller module 108 can be configured so that the predetermined distance range for determining a positive occurrence of occupancy corresponds to the position and width of each parking space 400a, 400b (ex: the space between the near side of the sidewalk and the side of the traffic lane 412 adjacent the parking spaces 400a, 400b).

In the examples illustrated in FIGS. 6 and 7, each occupancy monitoring device and its associated parking space have a one-to-one relationship.

Figure 8:
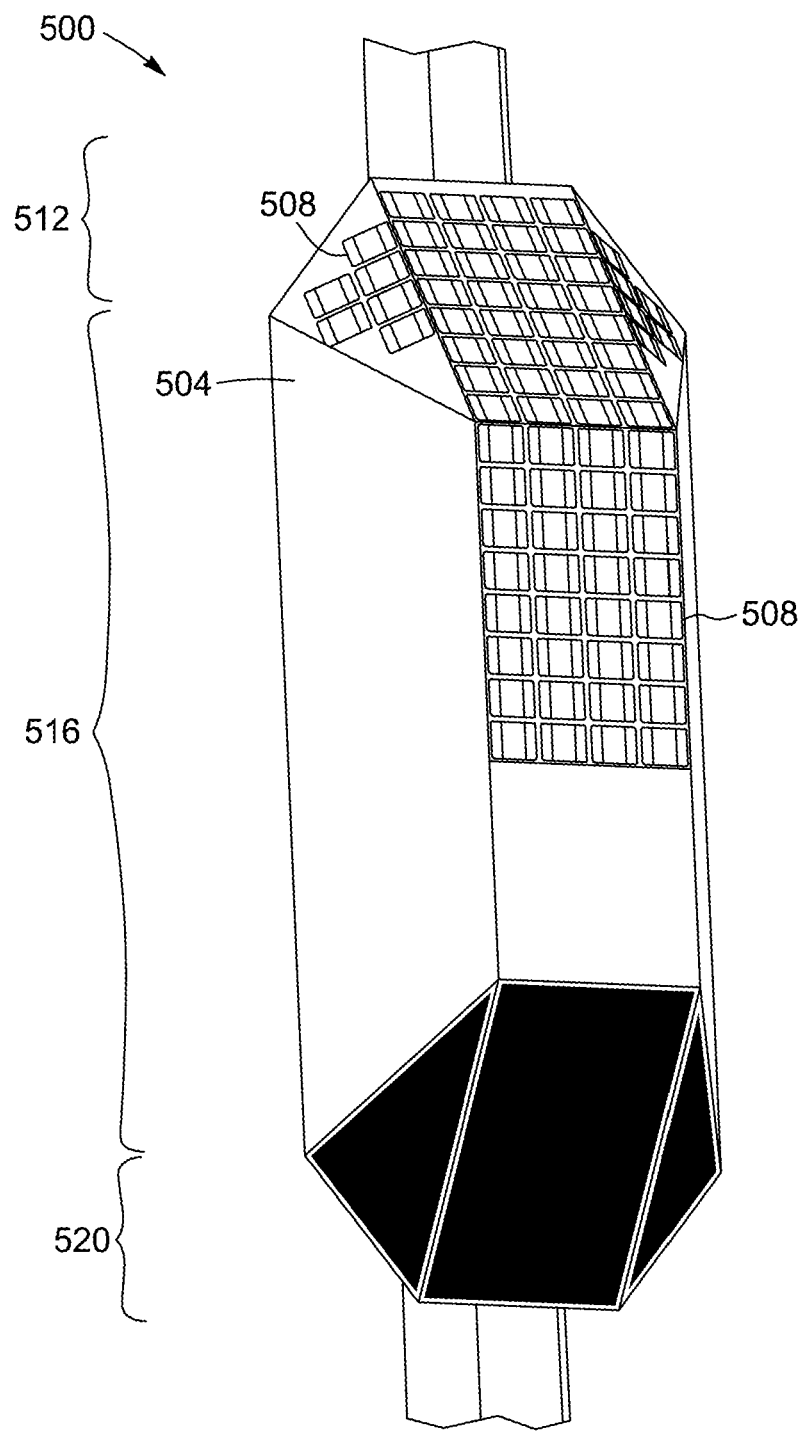
FIG. 8 illustrates a perspective view of a multi-location occupancy monitoring device according to one example embodiment.

Referring now to FIG. 8, therein illustrated is a perspective view of a multi-location occupancy monitoring device 500 according to an example embodiment. A single multi-location occupancy monitoring device 500 is capable of detecting the occupancy of each of a plurality of locations, such as the occupancy a vehicle within each of a plurality of parking spaces. The multi-location occupancy monitoring device 500 includes a sealed enclosure 504 that houses the occupancy sensor 116, the controller module 108, communication submodule 112 and the battery 140. Additionally, the antenna amplifier 124 and the antenna 132 can also be housed within the sealed enclosure.

At least one solar panel 508 may be positioned over the surface of the enclosure 504 to capture solar rays that are further converted to electrical energy to recharge the battery 140. In the illustrated example, a top portion 512 of the enclosure 504 tapers from a central portion 516 of the enclosure 504 towards a top end of the enclosure. Solar panels 508 can cover surfaces of the tapered top portion 512 of the enclosure. A solar panel can also be provided over a portion of the surface of the central portion 516.

A portion of the enclosure body 504 is permeable to sensing signals received by the occupancy sensor 116. Accordingly, the occupancy sensor 116 housed within the sealed enclosure 504 can receive sensing signals through the signal-permeable portion of the enclosure body 504.

According to one example embodiment, the occupancy sensor 116 of the multi-location occupancy monitoring device is an image capture device, such as a camera. Accordingly, the signal permeable portion of the enclosure body 504 can be one or more substantially transparent or translucent panels that allow passage of light therethrough. In the illustrated example, a bottom portion 520 of the enclosure 504 tapers from a central portion 516 of the enclosure 504 towards a bottom end of the enclosure. The tapered bottom portion 520 can be formed of substantially transparent or translucent panels. Furthermore, the camera can be oriented downwardly to capture images of a scene located below the multi-location occupancy monitoring device 500. The image capture device can further include at least one infra-red sensor to improve image capture in low-light conditions. The image capture device can have a wide field of view, such as an approximately 90 degrees field of view or greater.

Where the occupancy sensor 116 of the multi-location occupancy monitoring device 500 is an image capture device, the controller module 108 can be configured to carry out one or more image processing algorithms to detect occupancy of the plurality of locations being monitored. For example, background detection, object detection, and/or foreground differentiation techniques known in the art can be applied.

In the context of monitoring occupancy of a plurality of parking spaces, the image capture device 116 can be oriented so that the plurality of parking spaces are framed within the scene captured by the image capture device 116. The controller module 108 can be further configured to learn the positions and appearances of regions of the scene corresponding to each parking space being monitored and process further captured images to detect occupancy of one or more of the parking spaces.

The multi-location occupancy monitoring device 500 can further include an attachment mechanism for attaching the enclosure 504 to a raised location. The raised location can be a location that is at least 5 meters in height. For example, the raised location can be a location on a raised source of light, such as a street light or lamp-post. The raised location can also be the side of a building.

Figure 9:
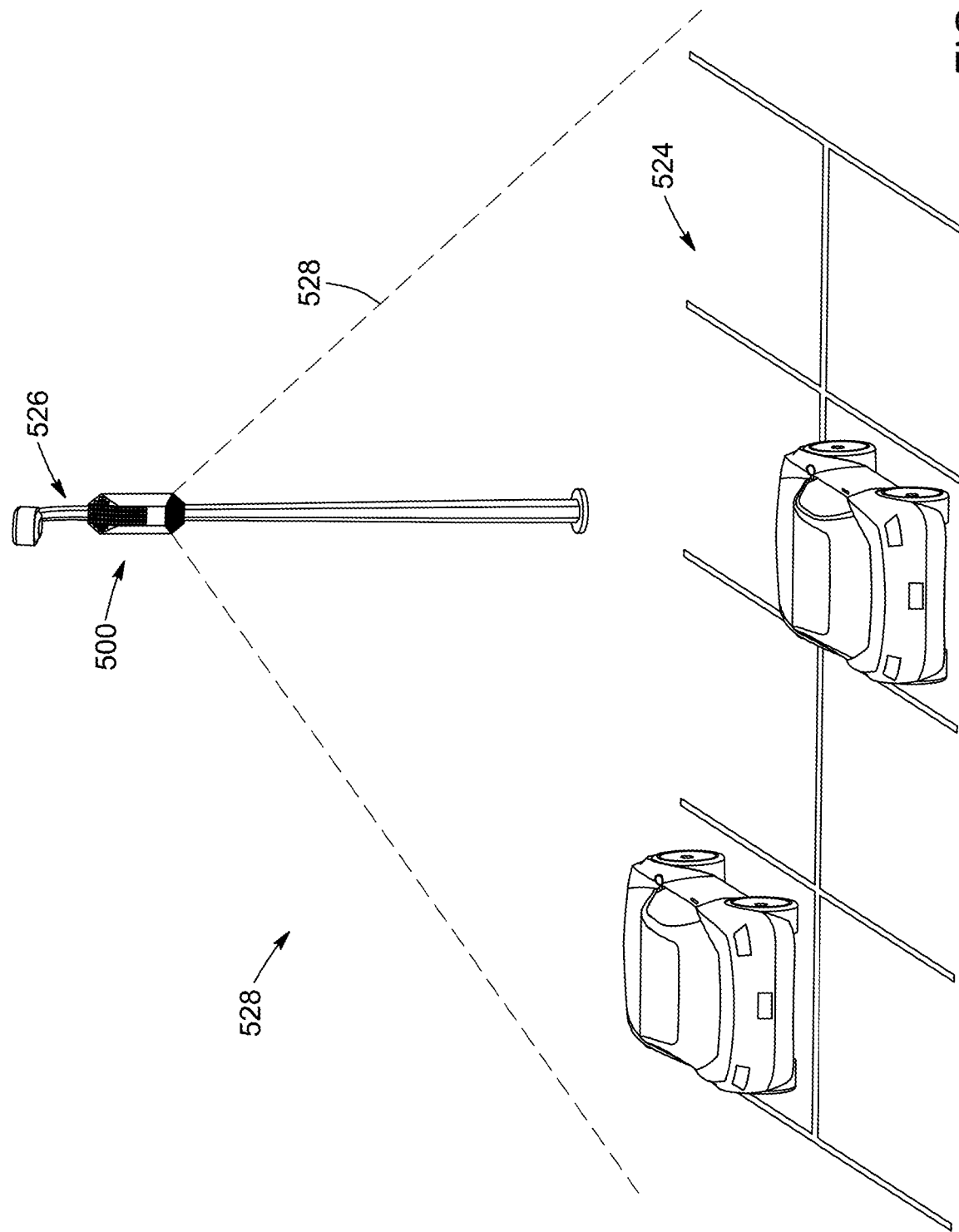
FIG. 9 illustrates a view of an exemplary parking lot environment in which a multi-location occupancy monitoring device has been deployed.

Referring now to FIG. 9, therein illustrated is a view of a parking lot environment in which a multi-location occupancy monitoring device 500 has been deployed. The multi-location occupancy monitoring device 500 is fixed at a raised location 526, which is a lamp post in the illustrated example. The occupancy sensor 116 of the multi-location occupancy monitoring device 500 is directed towards an array of parking spaces 524. It will be appreciated that due to the occupancy sensor 116 having a wide field of view 528, a plurality of parking spaces are simultaneously covered by the occupancy sensor 116.

Figure 10:
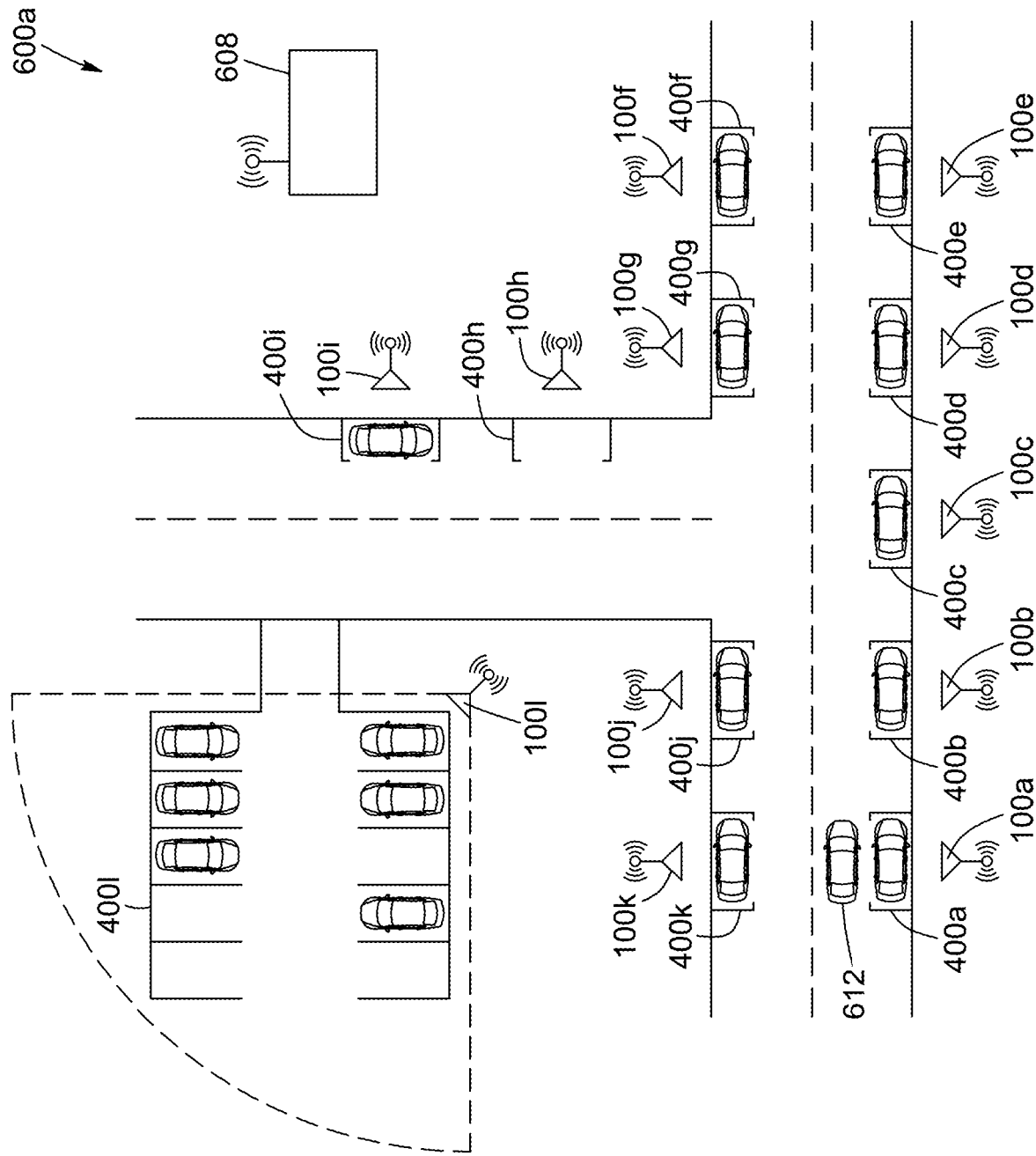
FIG. 10 illustrates a schematic diagram of an operating environment in which a plurality of occupancy monitoring modules are deployed according to a first example embodiment of an occupancy monitoring system.

Referring now to FIG. 10, therein illustrated is a schematic diagram of an operating environment in which a plurality of occupancy monitoring modules 100a to 100k are deployed according to a first example embodiment of an occupancy monitoring system 600a. As illustrated, the operating environment is a T-shaped intersection in which a plurality of parking spots 400a to 400k are located. Each occupancy monitoring module is deployed for monitoring occupancy of objects at a corresponding location. As illustrated, each occupancy monitoring module 100a to 100k is deployed to monitor occupancy of an automobile at a respective one of a plurality of parking spots 400a to 400k. Each occupancy monitoring module 100a to 100k is associated to the location at which it is deployed.

Each occupancy monitoring module 100a to 100k is positioned in proximity of its associated parking spot 400a to 400k and its occupancy sensor 116 is oriented towards that parking spot so as to be able to detect whether an automobile is parked in the parking spot.

Each occupancy monitoring module 100a to 100k is further configured to intermittently operate its communication submodule to transmit status and ID messages. Each status and ID message includes at least i) a unique location identifier associated to that occupancy monitoring module and ii) a status indicating the current occupancy of an automobile within the parking spot 400a to 400k for that occupancy monitoring module.

Each occupancy monitoring module 100a to 100k transmits its status and ID messages independently of the transmission of any other occupancy monitoring module 100a to 100k. That is, any given occupancy monitoring module 100a to 100k does not know how its neighbors are transmitting status and ID messages, although some collision avoidance schemes may be implemented. According to the first example embodiment, any given occupancy monitoring module 100a to 100k does not know the identifiers or the current occupancy status of any of its neighbors.

As described herein, the controller submodule 108 of an occupancy monitoring module 100 can be configured to operate in an active mode having higher power consumption and a power-down mode having substantially lower power consumption. The controller submodule 108 can be configured to operate in the power-down mode most of the time to save battery. The controller submodule 108 can intermittently awaken to operate in the higher power consumption to cause the occupancy sensor 116 to detect a current status of the occupancy of the location being monitored by the module 100. While in the higher power consumption mode, the controller submodule 108 can also cause the controller submodule 108 to send a status and ID message that includes an indicator of the current status of the occupancy that was just detected. The controller submodule 108 can then return to the power-down mode to resume battery saving until the next time it wakes up. According to one example embodiment, the occupancy monitoring module may have a 20,000 mAH capacity battery and it is expected that the battery can power the occupancy monitoring module for approximately a year without requiring replacement.

The occupancy monitoring system 600 further includes a central monitoring device 600. Each occupancy monitoring module 100a to 100k transmits its status and ID messages in the long-range wireless communication mode, as described elsewhere herein. These status and ID messages are received at a central monitoring device 608. The central monitoring device 608 may be implemented as a plurality of computerized devices, such as a cluster of servers. The central monitoring device 608 stores the received statuses of the detected occupancy and the unique location identifiers and makes these statuses and unique location identifiers available to one or more user devices over a wide-area network, such as the Internet.

A user device may be any electronic device having a communication module operable to receive the status and ID messages and a display device to display a visual representation of the status and ID messages. For example, the user device may be, but not limited to, cellphone, tablet, laptop computer, portable videogame console, or a vehicle's infotainment system.

It will be understood that since each occupancy monitoring module 100a to 100k according to example deployment of FIG. 10 transmits status and ID messages independently to the central monitoring device 608, any failure in the communication link between a given one of the occupancy monitoring modules with the central monitoring device 608 does not affect the communication link of any of the other occupancy monitoring modules.

In the illustrated example, a user driving through the area operates a user device 612. The user device 612 further has stored therein a list of unique location identifiers entries of all of the occupancy monitoring module 100 within the operating environment (ex: for a neighborhood, for a whole city, etc). The list of unique location identifiers may be preloaded onto user device, such as being stored within a software application (ex: mobile app) installed on the user device. For each of the unique location identifier entries, the user device 612 has stored thereon coordinates for the location associated to the occupancy monitoring module corresponding to that entry. For example, for a given unique location identifier entry identifying a given occupancy monitoring module, the user device 612 has stored thereon the geographical coordinates of the parking space associated to that occupancy monitoring module. The list of coordinates may also be preloaded onto the user device 612. For each of one or more unique location identifiers within the list, the user device 612 also has stored thereon a list of sensor status entries associated to that unique location identifier. A sensor status entry for a particular unique location identifier entry indicates the occupancy status for the occupancy monitoring module associated to that unique location identifier. A sensor status entry may also have a time-stamp to indicate the recency of the sensor status entry.

When a status and ID message is received at the user device 612 from an occupancy monitoring module, the user device 612 is operated to identify the unique location identifier contained in the message and update the sensor status entry within the list associated to that unique location identifier according to the occupancy status indicated in the status and ID message. Accordingly, the sensor status entry for that occupancy monitoring module is updated using the information received in the status and ID message. The user device can further display on its display device a visual representation of the information stored within the lists. For example, the visual representation may show a map, wherein locations corresponding to parking spaces and as indicated by the coordinate are shown as visual elements on the map (ex: an icon) and the status for each of those parking spaces are indicated according to the sensor status entries for those identifiers (ex: green to show available space, red to show space is occupied).

In the illustrated example, each of the occupancy monitoring modules 100a to 100g and 100i will detect that their respective associated parking spaces 400a to 400h and 400i are currently occupied. Only occupancy monitoring module 100h will detect that its associated parking space 400h is currently unoccupied. These detected occupancy statuses are independently transmitted to the central monitoring device 608, whereby the status entries stored at the central monitoring device 608 are appropriately updated for each unique location identifier. The user device 608 can further download these statuses and unique location identifiers from the central monitoring device 608. Accordingly, the user device 608 can display information indicating that parking space 400h is currently unoccupied.

In the illustrated example, subsequent to receiving the most up-to-date information stored at the central monitoring device 608, the user device 612 will have detected occupancy status information indicating that only parking space 400h is currently unoccupied. Using the geographical coordinates stored at the user device 612 and associated to the unique location identifier for parking space 400h, the user operating the vehicle and user device 612 can navigate to the parking space 400h. It will be appreciated that being able to obtain timely information pertaining to occupancy status, the user avoided navigating to the part of the road that has spaces 400d, 400e, 400f and 400g, which are all occupied.

According to one example embodiment, and as illustrated in FIG. 10, the occupancy monitoring system 600 further includes a multi-location occupancy monitoring module 100l that is deployed within a multi-location occupancy monitoring device. In the illustrated example, the multi-location occupancy monitoring module 100l is located in proximity of a parking lot 400l having 10 spaces. It will be appreciated that due to the multi-location occupancy monitoring module 100l having a wide field of view, occupancy of each of the 10 parking spaces can be individually detected by the multi-location occupancy monitoring module 100l. The multi-location occupancy monitoring module 100l is also operable to transmit status and ID messages in the long-range wireless communication mode, as described elsewhere herein. Each message includes a set of unique location identifiers and a set of status of detected occupancy. Each unique location identifier of the set is uniquely associated to one of the parking spaces. Each status of detected occupancy indicator is uniquely associated to one of the unique location identifiers and indicates the current occupancy status of the parking space associated to that unique location identifier. The status and ID messages transmitted from the multi-location occupancy monitoring module 100l can also be received by the central monitoring device 608 and the status indicators of the messages are used to update status entries corresponding to those unique location identifiers of the status and ID messages. Accordingly, information pertaining to the current status of the occupancy of the parking spaces being monitored by the multi-location occupancy monitoring module 100l can also be received by the user device 612. In the illustrated example, the user device 612 will display that 4 of the 10 parking spaces being monitored by the multi-location occupancy monitoring module 100l are currently unoccupied.

Figure 11:
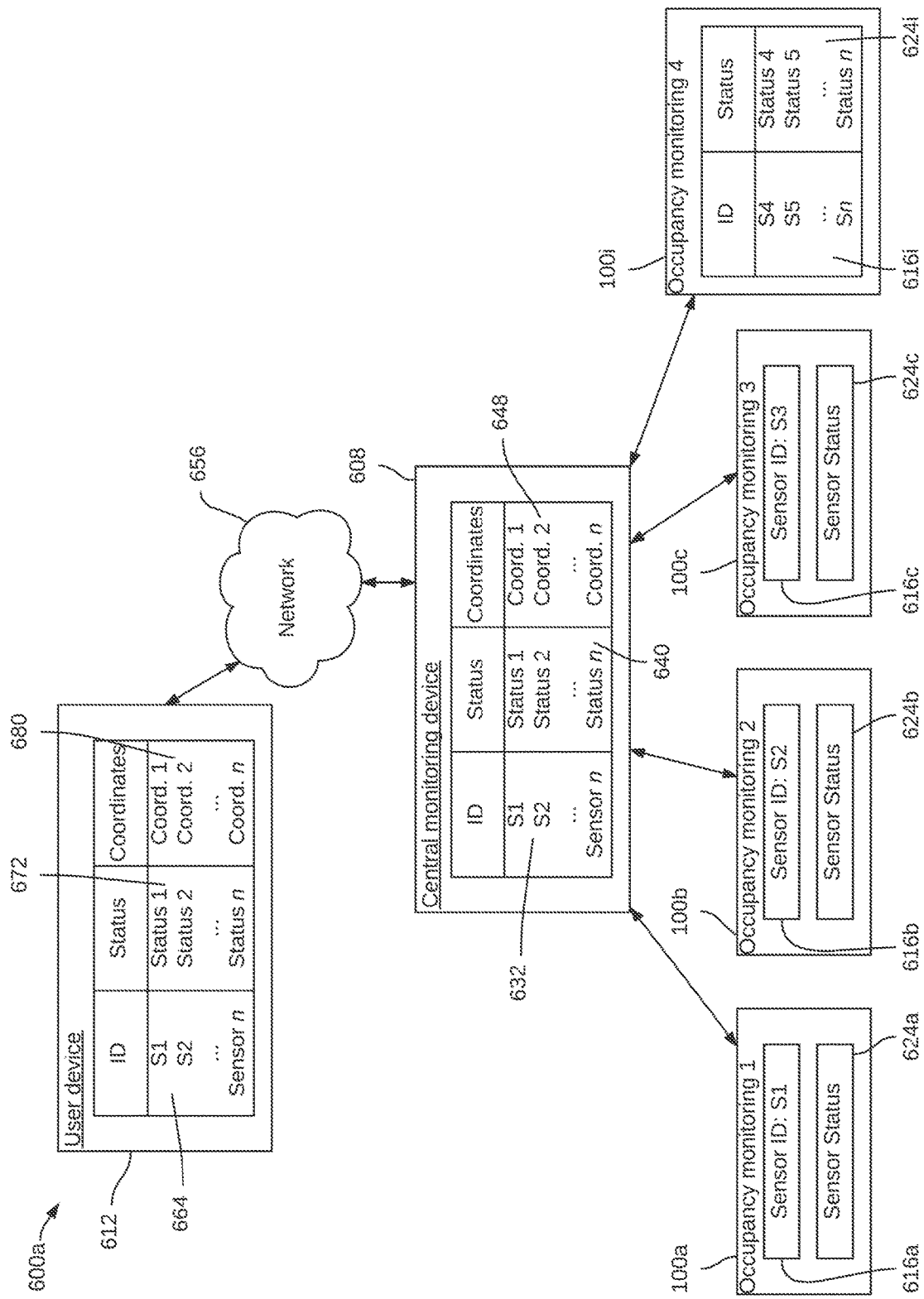
FIG. 11 illustrates components of the occupancy monitoring system according to the first example embodiment.

Referring now to FIG. 11, therein illustrated is a schematic diagram of the operational information stored at and communicated amongst the occupancy monitoring modules 100, the central monitoring device 608 and a user device 612 within the occupancy monitoring system 600a. As illustrated, a first occupancy monitoring module 100a, a second occupancy monitoring module 100b and a third occupancy monitoring module 100c each have stored therein a respective unique ID entry 616a, 616b, and 616c and a respective occupancy status entry 624a, 624b, and 624c denoting whether the occupancy sensor 116 of the given occupancy monitoring module detects occupancy within the location associated to that occupancy monitoring module.

In one example embodiment, and as illustrated, the system 600 may further include a multi-location monitoring module 100j that has stored thereon a plurality of unique location ID entries 616j and a plurality of occupancy status entries 624j, each occupancy status entry being associated to a corresponding one of the unique location ID entries 616j. The unique location ID entries 616j identify the plurality of locations being monitored by the multi-location monitoring module 100j and each occupancy status entry indicates the most recently detected occupancy status for its associated unique location ID entry.

Continuing with FIG. 11, and as described elsewhere herein, the occupancy monitoring modules 100a, 100b, 100c and/or 100j are each in independent long-range communication with the central monitoring device 608. The central monitoring device 608 receives the status and ID messages transmitted from the occupancy monitoring modules 100a, 100b, 100c and/or 100j. As described elsewhere herein, the central monitoring device 608 has stored thereon a list of unique location identifier entries. These entries may encompass all of the occupancy monitoring modules that have been deployed in the occupancy monitoring system 600a and within the operating environment (ex: for a neighborhood, for a whole city, etc.). For each of the unique location identifiers of the list 632, the occupancy monitoring system 600 further has stored thereon a sensor status entry associated to that unique location identifier. These sensor status entries may be stored within list 640. The occupancy monitoring system 600 may further have stored thereon, for each of the unique location identifiers of the list 632, a location coordinates associated to that unique location identifier. These sensor status entries may be stored within list 648. As a status and ID message is received from one of the occupancy monitoring modules, the central monitoring device 608 identifies the unique location identifier(s) included in the message and updates within the list 640 the stored status identifier associated to the unique location identifier(s) based on the sensed status entry(ies) of the received message.

A user device 612 downloads the occupancy status information from the central monitoring device 608 over a wide-area network 656, such as the Internet. In some cases, the user device 612 will only download a subset of the entries stored at the central monitoring device 608. For example, only those entries that is relevant to the user device 612 is downloaded (ex: only information pertaining to the user device 612 within a given distance radius of the current geographical location of the user device 612 is downloaded). The user device 612 has stored thereon a list 664 of unique location identifier entries of all, or a subset of, the occupancy monitoring modules 100 within the operating environment (ex: for a neighborhood, for a whole city, etc). The list 664 of unique location identifiers may be preloaded onto the user device, such as being stored within a software application (ex: mobile app) installed on the user device. For each of the unique location identifier entries, the user device 612 further has stored thereon coordinates for the geographical location associated to the occupancy monitoring module corresponding to that entry. These locations may be stored within a list 680. For example, for a given unique location identifier entry identifying a given occupancy monitoring module, the user device 612 has stored thereon the geographical coordinates of the parking space associated to that occupancy monitoring module. The list 680 may also be preloaded onto the user device 612. For each of the unique location identifiers within the list 664, the user device 612 also has stored thereon, within a list 672, sensor status entries associated that unique location identifier. A sensor status entry for a particular unique location identifier entry indicates the occupancy status for the occupancy monitoring module associated to that unique location identifier. A time stamp can be stored for each status entry to indicate the recency of the status information. As status information is downloaded from the central monitoring device 608, the sensor status entry can be updated to reflect the information in the list 640 stored within the central monitoring device 608.

Figure 12:
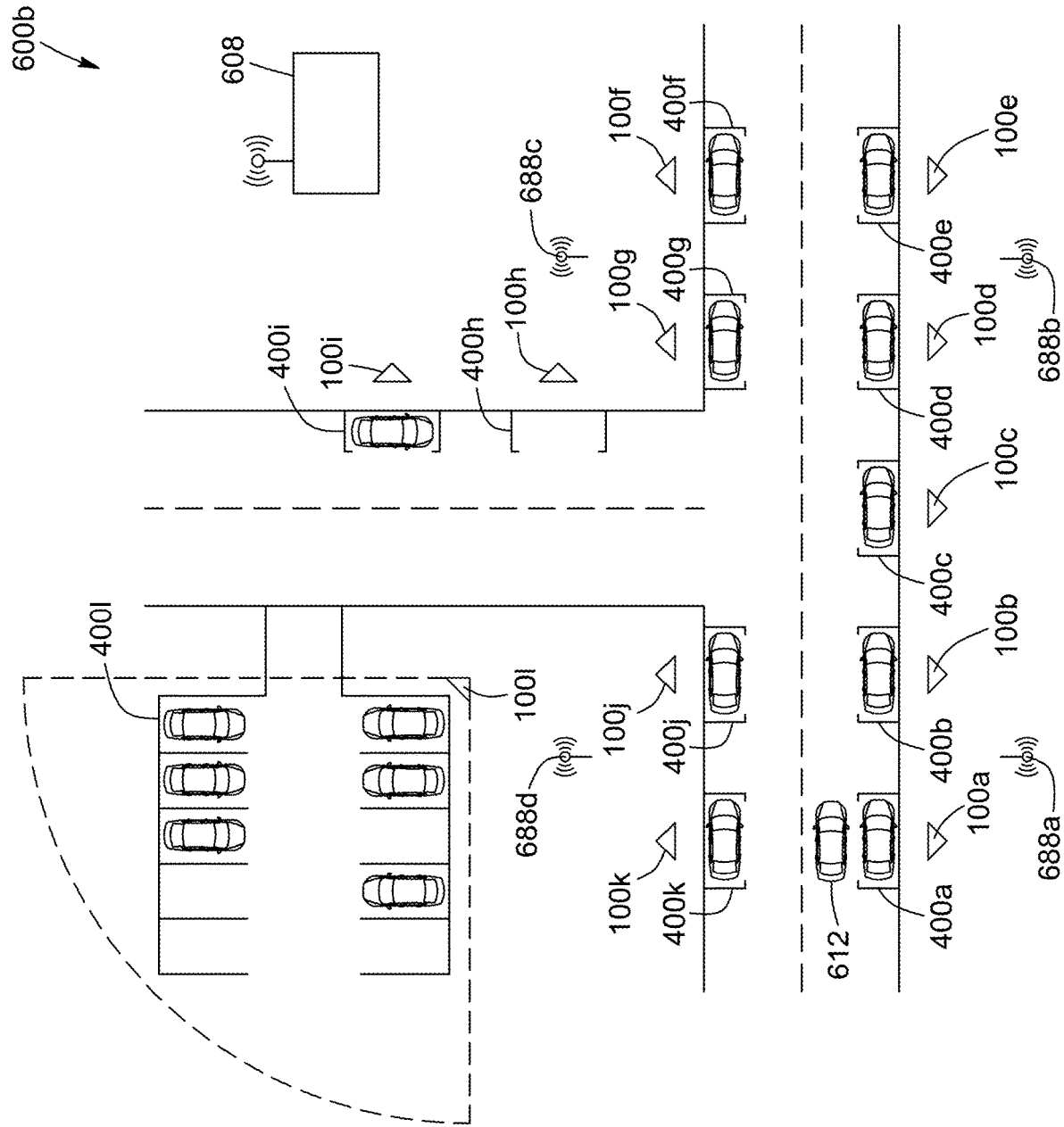
FIG. 12 illustrates a schematic diagram of an operating environment in which a plurality of occupancy monitoring modules are deployed according to a second example embodiment of a occupancy monitoring system.

Referring now to FIG. 12, therein illustrated is a schematic diagram of an operating environment in which a plurality of occupancy monitoring devices 100a to 100j are deployed according to a second example embodiment of an occupancy monitoring system 600b. FIG. 12 is similar to FIG. 10 described above in that a plurality of occupancy monitoring module 100a to 100k (and optionally 100l) are deployed within the operating environment to monitor the occupancy of an automobile at a respective one of a plurality of parking spots 400a to 400k (and optionally parking lot 400l) and each occupancy monitoring module is associated to the location at which it is deployed.

As illustrated in FIG. 12, a plurality of receiving antennas 688a, 688b, 688c and 688d are positioned at various locations within the operating environment. Each antenna is positioned within transmission range of a respective subset of the occupancy monitoring modules 100a to 100l. An antenna is further operable to receive status and ID messages transmitted from the subset of occupancy monitoring modules 100a to 100l within transmission range of the antenna.

Each antenna is further configured to retransmit the status and ID messages that its receives to the central monitoring device 608 over a wide-area network, such as the Internet, or using a long-range communication mode. The received status and ID messages may be transmitted individually or within a bulk retransmission of messages.

Like in the example embodiment described herein with reference to FIG. 10, each occupancy monitoring module 100a to 100l transmits its status and ID messages independently of the transmission of any other occupancy monitoring module 100a to 100l. That is, any given occupancy monitoring module 100a to 100l does not know how its neighbors are transmitting status and ID messages, although some collision avoid schemes may be implemented.

While each antenna is only receiving status and ID messages from those occupancy monitoring modules within transmission range, the central monitoring device 608 is operable to know the occupancy status of occupancy monitoring modules within transmission range of a plurality of antennas by receiving retransmissions of status and ID messages from each of these antennas. A user device 612 may download from the central monitoring device 608, such as over the wide-area network, the occupancy status sensed at a plurality of occupancy monitoring modules, including those that are not within low-energy transmission range of the user device. In this way, the user device may analyze occupancy status of locations that are not in the immediate vicinity of the user device.

In the example illustrated in FIG. 12, a first antenna 688a is located within transmission range of occupancy monitoring modules 100a, 100b and 100c, a second antenna 688b is located within transmission range of occupancy monitoring modules 100d and 100e, a third antenna 688c is located within transmission range of occupancy monitoring modules 100*f*, 100*g*, 100*h* and 100*i* and a fourth antenna 688*d* is located within transmission range of occupancy monitoring modules 100*j*, 100*k* and 100*l*. Fourth antenna 688*d* is illustrated as falling within the transmission range radiuses of modules 100*j*, 100*k* and 100*l* (for clarity of illustration, transmission range radiuses of the other occupancy monitoring modules are not illustrated). Each of the antennas 688*a*, 688*b*, 688*c* and 688*d* receive status and ID messages from its nearby occupancy monitoring modules and retransmits the messages to central monitoring device 608. An automobile in the operating environment can download information from the central monitoring device 608 pertaining to the occupancy status of each of the modules 100*a* to 100*l*.

Figure 13:
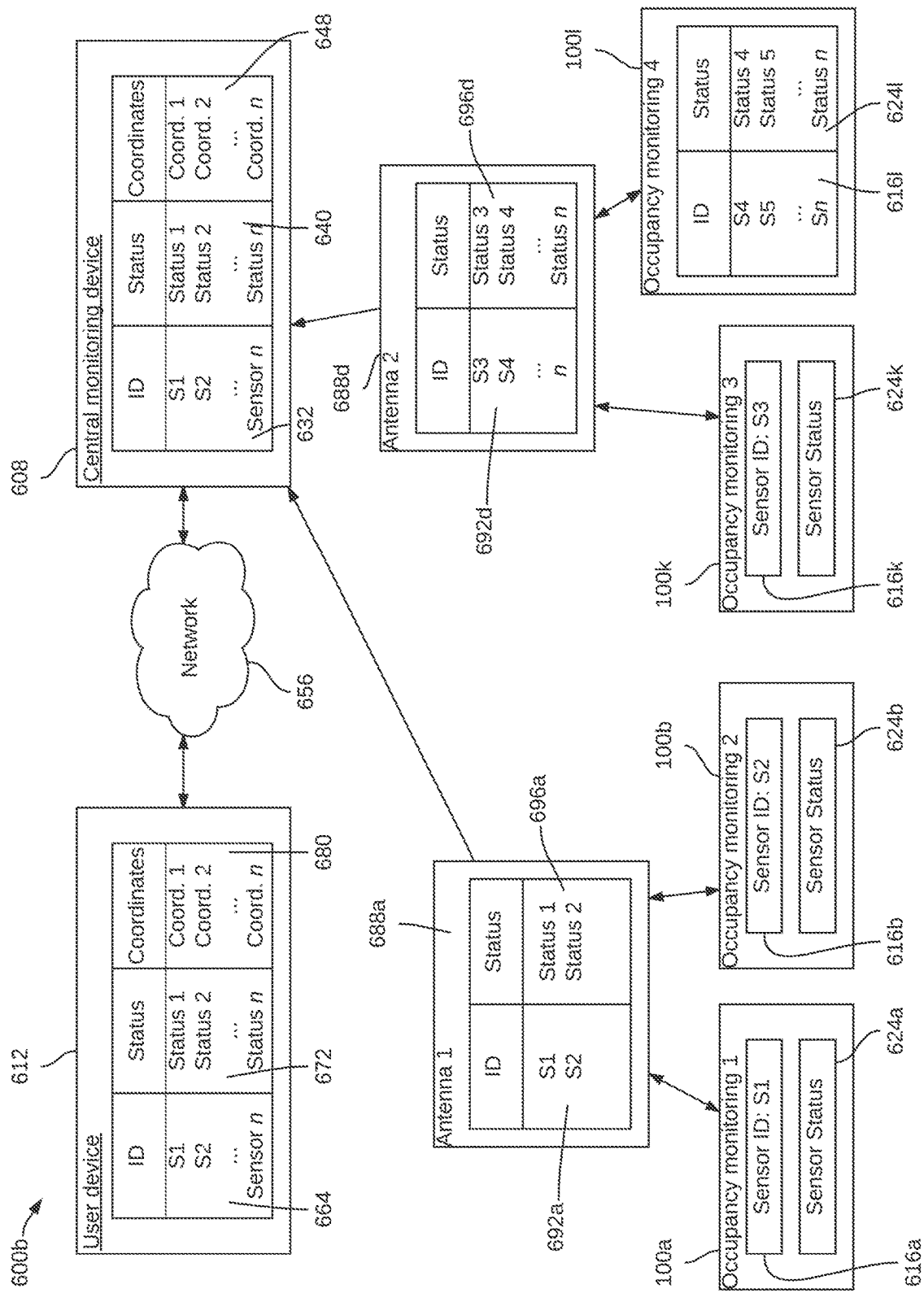
FIG. 13 illustrates components of the occupancy monitoring system according to the second example embodiment.

Referring now to FIG. 13, therein illustrated is a schematic diagram of the operational information stored at and communicated between the occupancy monitoring modules, antennas, central monitoring device 608 and user device 612 within the second example embodiment of the occupancy monitoring system 600*b*. As illustrated, a first occupancy monitoring module 100*a*, a second occupancy monitoring module 100*b*, and a third occupancy monitoring module 100*k* each have stored thereon a respective unique ID entry 616*a*, 616*b*, 616*k* and a respective occupancy status entry 624*a*, 624*b*, and 624*k* denoting whether the occupancy sensor 116 of the given occupancy monitoring module 100 senses an occupancy within the location associated to that occupancy monitoring module. In an example, and as illustrated, the system 600 may further include the multi-location monitoring module 100*l*, which has the characteristics as described herein with reference to FIG. 11.

Continuing with FIG. 13, the first occupancy monitoring module 100*a* and the second occupancy monitoring module 100*b* are in direct communication with a first antenna 688*a* and a third occupancy monitoring module 100*k* is in direct communication with a second antenna 688*d*. A fourth occupancy monitoring module 100*l*, being a multi-location occupancy monitoring module 100*l* can also be in direct communication with the second antenna 688*d*.

In one example embodiment, the antennas 204*a* and 204*d* are configured to retransmit the status and ID messages that it receives to the central monitoring device 608. Alternatively, and as illustrated, each antenna may have stored thereon a list 692*a*, 692*d* of unique location identifier entries for occupancy monitoring modules within transmission range thereof and status entries 696*a*, 696*d* indicating the occupancy status for these occupancy monitoring modules. The antenna can then intermittently transmit the information it has stored thereon to the central monitoring device 608.

The central monitoring device 608 has stored thereon a list 632 of unique location identifier entries of all of the occupancy monitoring module 100 within the operating environment. For each of the unique location identifier entries, the central monitoring device 608 further has stored thereon, within the list 640 of the sensor status entries, a status entry associated to that unique location identifier. The central monitoring device 608 may optionally have stored thereon a list 648 of the coordinates of the location associated to the occupancy monitoring module corresponding to each unique location identifier entry. The user device 612 receives occupancy status entries over the wide area network 656 from the central monitoring device 608.

As illustrated, the user device 612 also has stored thereon the list 664 of unique location identifier for occupancy monitoring modules within the operating environment, a list 680 coordinates of the locations associated to the occupancy monitoring modules and a list of occupancy status entries 672 for the occupancy monitoring modules. The information stored on the user device 612 may be updated through additional data received from the central monitoring device 608. The information stored can be displayed within a representation on the display device of the user device so that a user can consume the information (ex: to locate nearby available parking spaces).

It will be appreciated that the antennas act as gateway in that each gateway receives status and ID messages from a plurality of occupancy monitoring devices and retransmits those messages to the central monitoring device 608. The antenna may include as a Wi-Fi gateway or an Xbee gateway.

Figure 14:
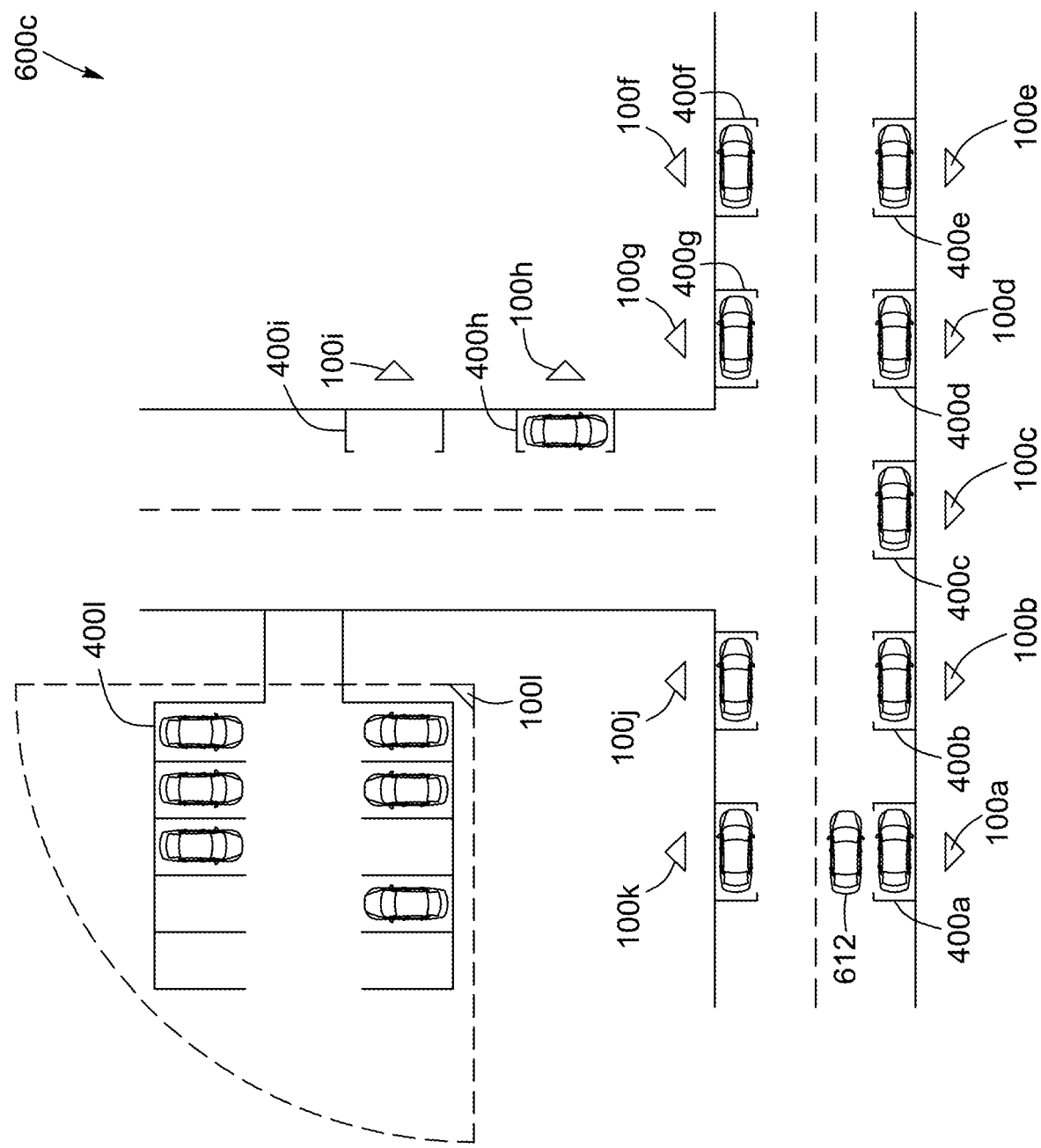
FIG. 14 illustrates a schematic diagram of an operating environment in which a plurality of occupancy monitoring modules are deployed according to a third example embodiment of a occupancy monitoring system.

Referring now to FIG. 14, therein illustrated is a schematic diagram of an operating environment in which a plurality of occupancy monitoring devices 100*a* to 100*j* are deployed according to a third example embodiment of an occupancy monitoring system 600*c*. FIG. 14 is similar to FIGS. 10 and 12 described above in that a plurality of occupancy monitoring module 100*a* to 100*k* (and optionally 100*l*) are deployed within the operating environment to monitor the occupancy of an automobile at a respective one of a plurality of parking spots 400*a* to 400*k* (and optionally parking lot 400*l*) and each occupancy monitoring module is associated to the location at which it is deployed.

In the example of FIG. 14, an automobile carrying a user device 612 has entered the operating environment. A driver or passenger of the automobile carrying the user device 612 that is operable to receive status and ID messages from one or more of the occupancy monitoring module 100*a* to 100*k* (and optionally 100*l*). Additionally or alternatively, the automobile is equipped with a user device operable to receive the status and ID messages.

As the automobile carrying user device 612 travels through the operating environment, it comes within range of a subset of the occupancy monitoring module 100*a* to 100*k* (and optionally 100*l*). Accordingly, the user device is also within range of a subset of the occupancy monitoring module 100*a* to 100*k* (and optionally 100*l*). The transmission ranges of the communication submodules of each occupancy monitoring modules 100*a* to 100*k* (and optionally 100*l*) are configured in accordance with the locations of the occupancy monitoring modules 100*a* to 100*k* (and optionally 100*l*) so that the transmissions in the low-energy communication mode from at least two occupancy monitoring modules are receivable at substantially the same time by a single user device. That is, there are areas within the operating environment where the transmission ranges of at least two occupancy monitoring modules 100*a* to 100*k* (and optionally 100*l*) overlap so that an automobile located in such areas can receive transmissions from the at least two occupancy monitoring modules 100*a* to 100*k* (and optionally 100*l*) at substantially the same time. Preferably, the transmission ranges of the occupancy monitoring modules 100*a* to 100*k* (and optionally 100*l*) are chosen so that messages from more than two (ex: at least 10) occupancy monitoring modules 100*a* to 100*k* (and optionally 100*l*) can be received at substantially the same time.

It will be understood that messages being received at "substantially the same time" herein refers to a user device being located at particular location to be within transmission ranges of the at least two occupancy monitoring modules 100*a* to 100*k* (and optionally 100*l*) to receive status and ID messages therefrom. Although the receiving of the status and ID messages from the at least two occupancy monitoring modules may be staggered in time, a user using the user device has the impression of receiving messages from each of the at least two occupancy monitoring modules in real-time.

In the example illustrated in FIG. 14, the automobile is being displaced through the operating environment. In its current location, the automobile carrying user device 612 is within the low-energy transmission range of occupancy monitoring modules 100a, 100b, 100k and 100l. Since these in-range occupancy monitoring modules 100a, 100b, 100k and 100l are each operating to detect the occupancy of automobiles in parking sports 400a, 400b, 400k and parking lot 400l and transmitting status of the detected occupancy and the unique location identifier(s) of each occupancy monitoring module 100a, 100b, 100k and 100l. The transmitted status and unique location identifier are received by a user device 612 of the vehicle. Accordingly, a user operating the user device can view the occupancy status of the in-range occupancy monitoring modules 100a, 100b, 100k and 100l.

Continuing with FIG. 14, the automobile is out of communication range of the remaining occupancy monitoring modules 100c to 100j. Accordingly, occupancy status of the parking spots 100c to 100j associated to these modules 100c to 100j are not known. However, as the automobile carrying user device 612 is further displaced, it may come within range of other occupancy monitoring modules 100c to 100j and know the occupancy status of other parking spots.

It will be appreciated that in the example illustrated in FIG. 14, the user device 612 within the automobile directly receives the status and ID messages from an occupancy monitoring module 100 in that a status and ID message that is received at the user device is the original status and ID message transmitted from the occupancy monitoring module 100 (without any intermediate retransmissions). The status and ID message may be transmitted in the low energy communication mode.

Figure 15:
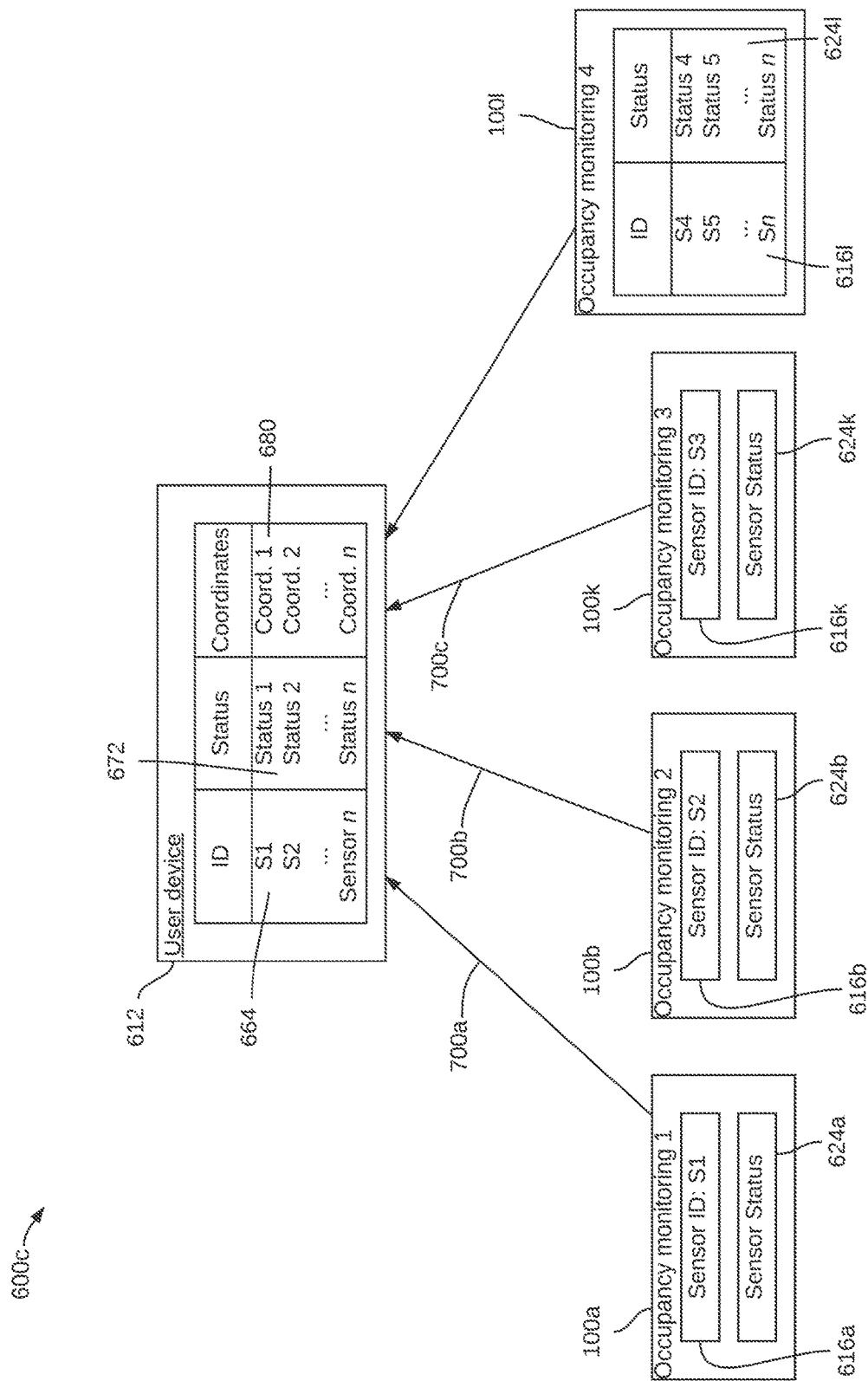
FIG. 15 illustrates components of the occupancy monitoring system according to the third example embodiment.

Referring now to FIG. 15, therein illustrated is a schematic diagram of the operational information stored at and communicated between occupancy monitoring modules 100 and a user device 612 within the third example embodiment of the occupancy monitoring system 600c. As illustrated, a first occupancy monitoring module 100a, a second occupancy monitoring module 100b, and a third occupancy monitoring module 100k each have stored therein a respective unique ID entry 616a, 616b, 616k and a respective occupancy status entry 624a, 624b, and 624k denoting whether the occupancy sensor 116 of the given occupancy monitoring module 100 senses occupancy within the location associated to that occupancy monitoring module.

Continuing with FIG. 15, the occupancy monitoring module 100a, 100b and 100c are in direct one-way communication in the low-energy mode with the user device 612, as denoted by the one-way continuous arrows 700a, 700b and 700c. Accordingly, the user device 612 directly receives status and ID messages from the first and second occupancy monitoring modules 100a, 100b. As described with reference to FIG. 13, the user device 612 also has stored thereon the list 664 of unique location identifier for occupancy monitoring modules within the operating environment, a list 680 of geographical coordinates of the locations associated to the occupancy monitoring modules and a list of occupancy status entries 672 for the occupancy monitoring modules. The information stored on the user device 612 may be updated through additional data received from the central monitoring device 608. The information stored can be displayed within a representation on the display device of the user device so that a user can consume the information (ex: to locate nearby available parking spaces).

Continuing with FIG. 15, the user device 6112 is in transmission range of first and second occupancy monitoring modules 100a, 100b and 100k receives status and ID messages therefrom to update the sensor status entries corresponding those modules 100a, 100b, 100k within the list 664. The user device 612 is out of transmission range of the other occupancy monitoring modules 100, and the sensor status entry within the list 612 for those other occupancy monitoring modules 100 are not being updated.

In one example embodiment, and as illustrated, the system 600 may further include a multi-location monitoring module 100l. Furthermore, in the example of FIG. 14, the automobile is within the transmission range of the multi-location monitoring module 100l. Status and ID messages received from this module 100l are used to update corresponding entries stored at the receiver device 612 within lists 664, 672 and 680.

Figure 16:
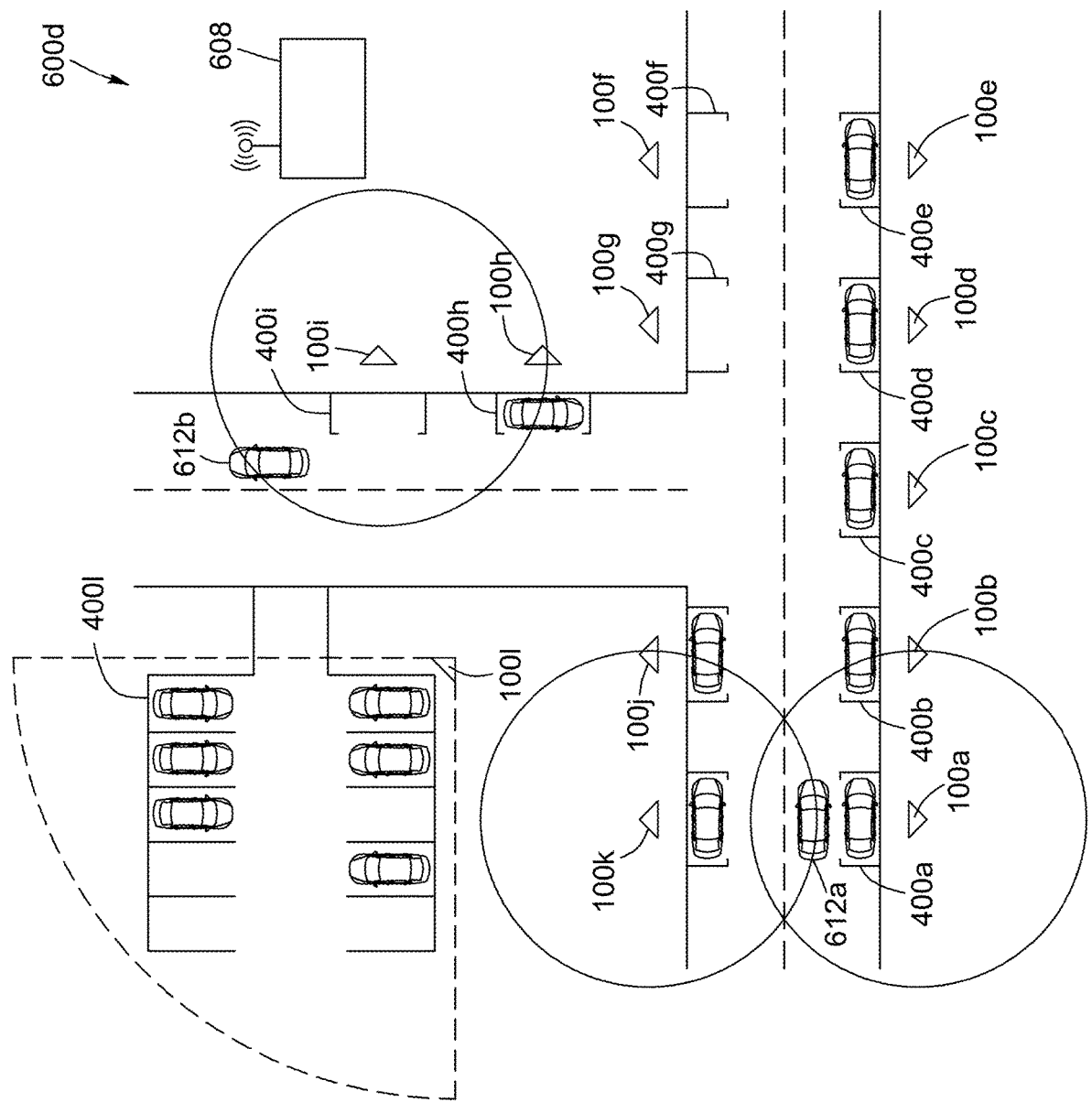
FIG. 16 illustrates a schematic diagram of an operating environment in which a plurality of occupancy monitoring modules are deployed according to a fourth example embodiment of a occupancy monitoring system.

Referring now to FIG. 16, therein illustrated is a schematic diagram of an operating environment in which a plurality of occupancy monitoring modules 100 and user device 612 are deployed according to a fourth example embodiment of an occupancy monitoring system 600d. FIG. 16 is similar to FIG. 14 described above in that a plurality of occupancy monitoring module 100a to 100k (and optionally 100l) are deployed within the operating environment to monitor the occupancy of an automobile at a respective one of a plurality of parking spots 400a to 400k (and optionally parking lot 400l) and each occupancy monitoring module is associated to the location (or parking lot) at which it is deployed. Like in the example embodiment described herein with reference to FIGS. 10, 12 and 14, each occupancy monitoring module 100a to 100k transmits its status and ID messages independently of the transmission of any other occupancy monitoring module 100a to 100k (and optionally 100l). That is, any given occupancy monitoring module 100a to 100k (and optionally 100l) does not know how its neighbors are transmitting status and ID messages, although some collision avoid schemes may be implemented. According to the first example embodiment, any given occupancy monitoring module 100a to 100k (and optionally 100l) does not know the identifiers or the current occupancy status of any of its neighbors.

As illustrated in FIG. 16, a plurality of user devices 612a and 612b are positioned at various locations within the operating environment. For example and as illustrated, the user devices 612a and 612b may be found on different vehicles traveling through the operating environment.

A first of the user device is configured to receive at substantially the same time the status and ID messages transmitted by the communication submodules of at least two occupancy monitoring modules in transmission range of the user device. The transmissions may be in the low-energy communication mode. The first user device is further configured to retransmit the status and ID messages that it receives to the central monitoring device 608 over a wide-area network, such as the Internet. The received status and ID messages may be transmitted individually or within a bulk retransmission of messages. Like for the antennas 688a to 688d described with reference to FIG. 14, the central monitoring device 608 is operable to receive retransmissions of status and ID messages from a plurality of user devices located across the operating environment.

A second of the user devices is configured to receive from the central monitoring device 608, such as over the wide-area network 220, the occupancy status sensed at the occupancy monitoring modules in transmission range of the first user device and whose status and ID messages were retransmitted by the first user device to the central monitoring device 608. In this way, the second user device can analyze occupancy status of locations that are not in the immediate vicinity of the second user device by leveraging status and ID messages received by the first user device.

In one example embodiment, and as illustrated, the system 600*d* may further include a multi-location monitoring module 100*l*.

In the example illustrated in FIG. 16, a first user device 612*a* located on a first automobile is within transmission range of occupancy monitoring modules 100*a*, 100*k* and a second user device 612*b* located on a second automobile is within transmission range of occupancy monitoring module 100*i* and multi-location occupancy monitoring module 100*l*. Status and ID messages transmitted from the occupancy monitoring modules 100*i* and 100*l* are received at the second user device 612 band further retransmitted to central monitoring device 608 over the wide area network. The occupancy status entries indicating the occupancy status as sensed by occupancy monitoring modules 100*i* and 100*l* are further received by the first user device 612*a* from the central monitoring device 608. Accordingly, the user device 612*a* located on the first automobile obtains occupancy information about parking places 400*i* and 400*l* even though it is out of transmission range of occupancy monitoring modules 100*i* and 100*l*. In the illustrated example, the first device 612*a* would receive information that parking space 400*i* is unoccupied and that there remains four unoccupied spaces in the parking lot 400*l*.

Figure 17:
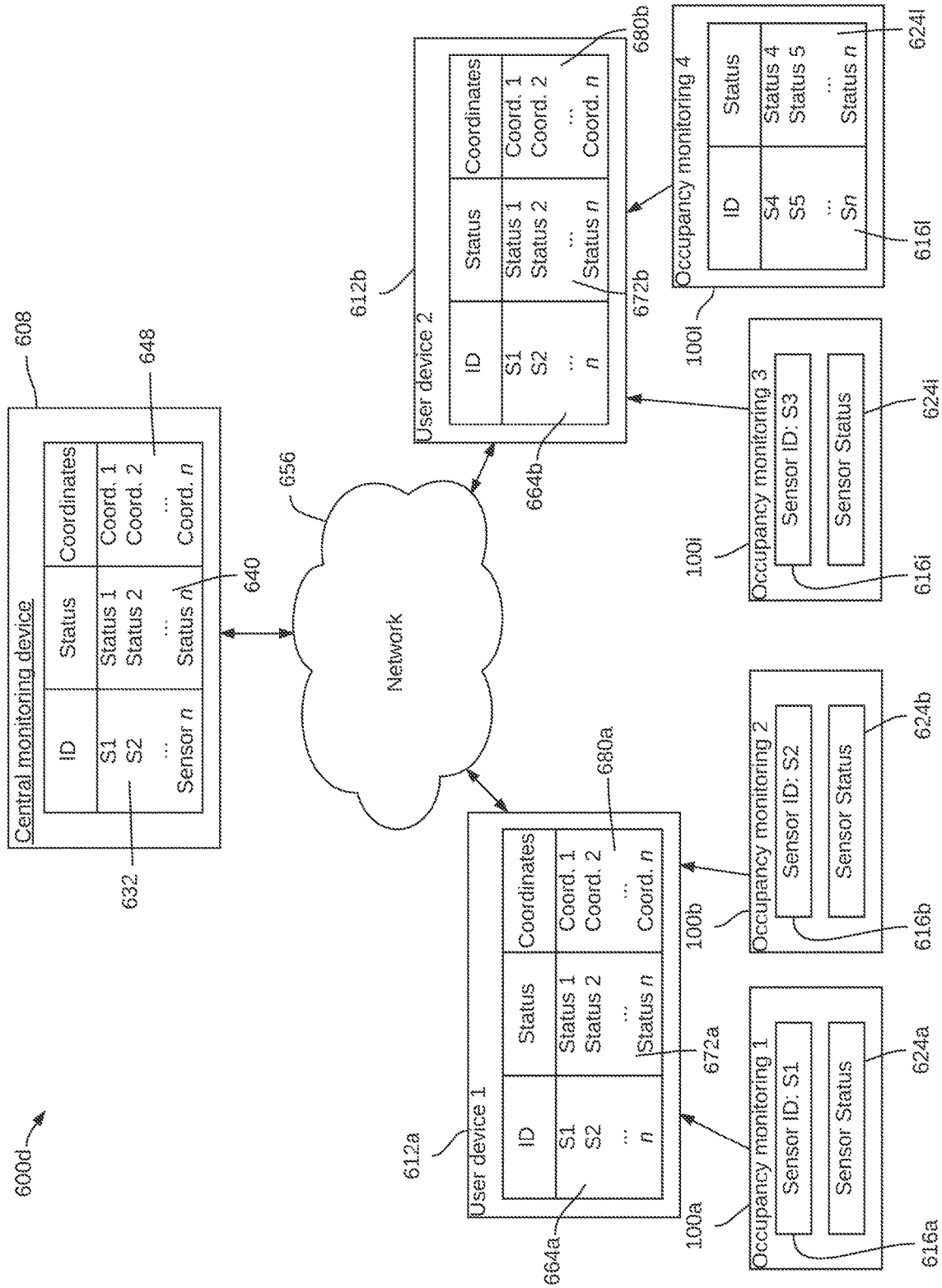
FIG. 17 illustrates components of the occupancy monitoring system according to the fourth example embodiment.

Referring now to FIG. 17, therein illustrated is a schematic diagram of the operational information stored at and communicated between occupancy monitoring modules, user devices and central monitoring module according to the fourth example embodiment of the occupancy monitoring system. As illustrated, occupancy monitoring modules 100*a*, 100*k*, and 100*i* have stored therein a respective unique ID entry 616*a*, 616*k*, and 616*i* and a respective occupancy status entry 624*a*, 624*k*, and 624*i* denoting whether the occupancy sensor 116 of the given occupancy monitoring module 100 senses an occupancy within the location associated to that occupancy monitoring module.

Continuing with FIG. 17, the occupancy monitoring modules 100*a* and 100*k* are in direct communication with a first user device 612. Occupancy monitoring module 100*i* and multi-location occupancy monitoring module 100*l* are in direct communication with a second user device 612*b*. The first user device 612*a* has stored thereon a list 664*a* of unique location identifiers for occupancy monitoring modules within the operating environment, a list 680*a* of coordinates of the locations associated to the occupancy monitoring modules and a list of occupancy status entries 672*a* for the occupancy monitoring modules. Similarly, the second user device 612*b* has stored thereon a list 664*b* of unique location identifiers for occupancy monitoring modules within the operating environment, a list 680*b* of coordinates of the locations associated to the occupancy monitoring modules and a list of occupancy status entries 672*b* for the occupancy monitoring modules.

The central monitoring device 608 has stored thereon a list 632 of unique location identifier entries of all of the occupancy monitoring modules within the operating environment, list 640 of the sensor status entries associated to that unique location identifier and list 648 of the coordinates of the location associated to the occupancy monitoring module corresponding to each unique location identifier entry. The sensor status entries associated to the unique location identifier entries are updated based on retransmission of status and ID messages from the user devices 612*a* and 612*b* over the network 656.

For each of the user devices 612*a* and 612*b*, the status entries associated to occupancy monitoring modules within transmission range of the user device is updated based on status and ID messages received directly from the in-range occupancy monitoring modules (modules 100*a* and 100*k* for first device 612*a* and module 100*i* and 100*l* for second device 612*b*). Status entries associated to occupancy monitoring modules that are not within low-energy transmission range of the user devices are updated based on data received from the central monitoring device 608. It will be appreciated that occupancy status information gathered by user devices 612*a*, 612*b* from their respective in-range occupancy monitoring modules are shared over the wide-area network 656 via the central monitoring device 608.

Figure 18:
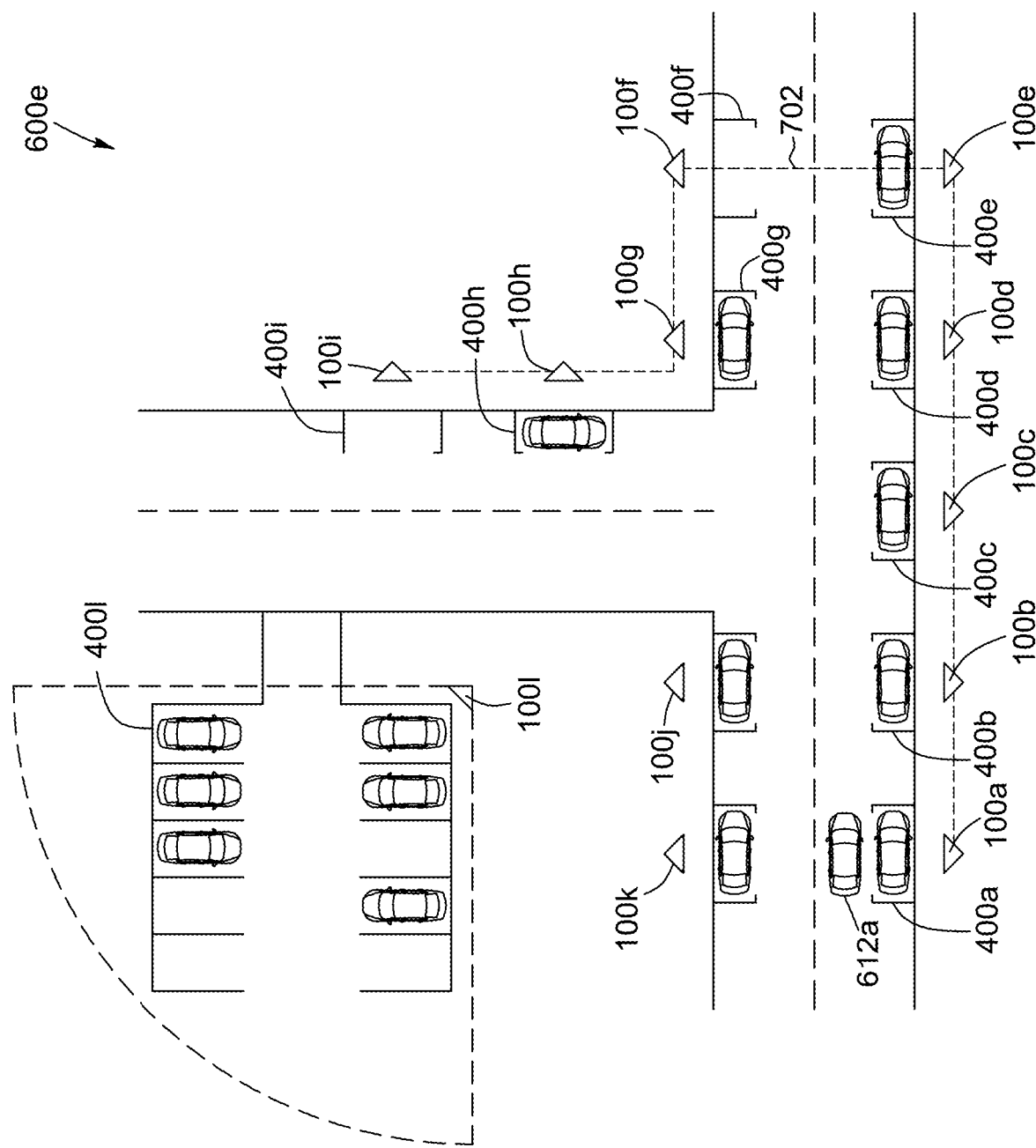
FIG. 18 illustrates a schematic diagram of an operating environment in which a plurality of occupancy monitoring modules are deployed according to a fifth example embodiment of a occupancy monitoring system.

Referring now to FIG. 18, therein illustrated is a schematic diagram of an operating environment in which a plurality of occupancy monitoring devices 1 are deployed according to a fifth example embodiment of an occupancy monitoring system 600*e*. FIG. 18 is similar to FIGS. 10, 12, 14, and 16 described above in that a plurality of occupancy monitoring module 100*a* to 100*k* (and optionally 100*l*) are deployed within the operating environment to monitor the occupancy of an automobile at a respective one of a plurality of parking spots 400*a* to 400*k* (and optionally parking lot 400*l*) and each occupancy monitoring module is associated to the location at which it is deployed.

According to the fifth example embodiment, the communication submodule of each of the occupancy monitoring modules 100*a* to 100*k* (and optionally 100*l*) are configured to not only transmit its status and ID message in the low-energy communication mode but is also configured to receive status and ID messages transmitted from another occupancy monitoring module. Each occupancy monitoring module is further configured to retransmit status and ID messages that it receives from other occupancy monitoring modules.

The occupancy monitoring module is configured to retransmit a status and ID message that it receives directly from another occupancy monitoring module. That is, the retransmitted status and ID message originated from that other occupancy monitoring module and indicates an occupancy status sensed at that other occupancy monitoring module.

The occupancy monitoring module is also configured to retransmit a given status and ID message that it receives from a second occupancy monitoring module acting as an intermediary. That is the given status and ID message indicates the occupancy status sensed by a third occupancy monitoring module and was received and retransmitted by the second occupancy monitoring module.

It will be understood that the occupancy monitoring modules are connected in a mesh network in which a status and ID message transmitted from a given occupancy monitoring module is repeated and relayed by other occupancy monitoring modules so that the message is flooded or propagated throughout the occupancy monitoring modules within the operating environment.

According to one example embodiment, a trickle algorithm defined in IETF RFC6206 (https://tools.ietf.org/html/rfc6206), which is incorporated herein by reference, may be used for propagation of status and ID messages throughout the occupancy monitoring modules forming a mesh network. Alternatively, various other methods known in the art for propagating messages with a mesh network may be used.

In the example illustrated in FIG. 18, an automobile having a user device 612 is located within low-energy transmission range of a first occupancy monitoring module 100*a*. A status and ID message transmitted from occupancy monitoring module 100*f* is received and retransmitted by occupancy monitoring module 100*e*, which is then received and retransmitted by each of occupancy monitoring modules 100*d*, 100*c*, 100*b* and 100*a*. Dotted line 702 denotes the path of retransmission of the status ID message originally transmitted from the occupancy monitoring module 100*f*. The retransmission of this status and ID message by the first occupancy monitoring module 100*a* is received at the user device of automobile 612. Accordingly, the user device can obtain information pertaining to the occupancy status at location 400*f* even though it is located out of transmission range of occupancy monitoring module 100*f*. The user device can obtain information pertaining to the occupancy status at locations 400*e*, 400*d*, 400*c*, and 400*b* in a similar way.

Figure 19:
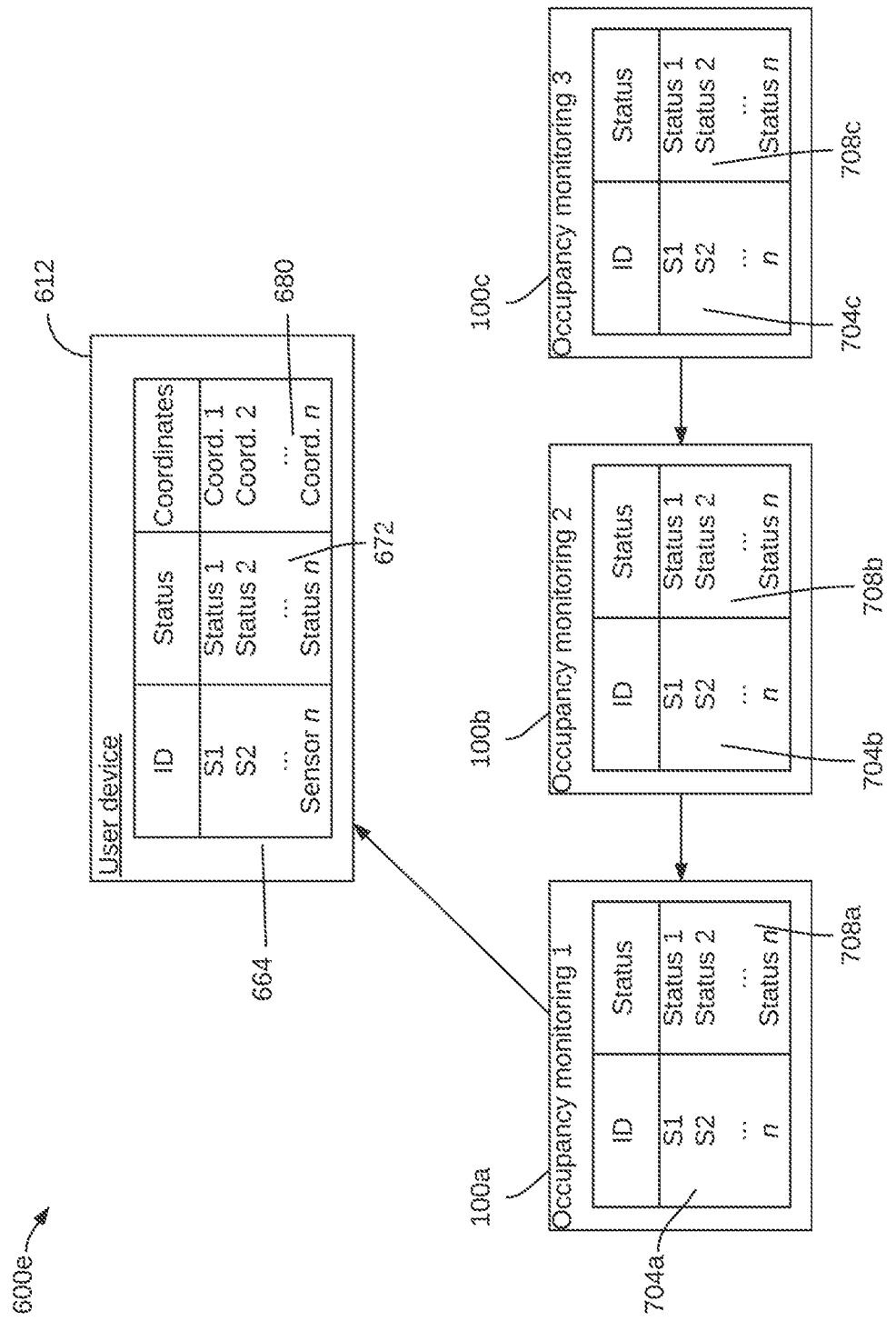
FIG. 19 illustrates components of the occupancy monitoring system according to the fifth example embodiment.

Referring now to FIG. 19, therein illustrated is a schematic diagram of the operational information stored at and communicated between the occupancy monitoring modules and user device 612 within the fifth example embodiment of the occupancy monitoring system.

In one example embodiment, each occupancy monitoring module has stored thereon a respective unique ID entry and a respective occupancy status entry denoting whether the occupancy sensor 116 of the occupancy monitoring module 100 senses an occupancy within the location associated to that occupancy monitoring module.

Alternatively, and as illustrated, each occupancy monitoring module has stored thereon a list (704*a*, 704*b*, 704*c*) of unique ID entries that includes its own unique location identifier as well as the unique location identifiers (708*a*, 708*b*, 708*c*) for other occupancy monitoring modules. For example, a first occupancy monitoring module 100*a* has a first list 704*a* of unique location identifier entries and a first list 708*a* of occupancy status entries for the unique location identifier entries, a second occupancy monitoring module 100*b* has a second list 704*b* of unique location identifier entries and a second list 708*b* of occupancy status entries for the unique location identifier entries, and a third occupancy monitoring module 100*c* has a third list 704*c* of unique location identifier entries and a third list 708*c* of occupancy status entries for the unique location identifier entries.

As illustrated, the second occupancy monitoring module 100*b* is within low-energy transmission range of the third occupancy monitoring module 100*c* and directly receives status and ID messages therefrom. Upon receiving the message, the second occupancy monitoring module 100*b* updates its status entry within list 708*b* for the third occupancy monitoring module 100*c*. The second occupancy monitoring module 100*b* then retransmits the occupancy status entry for the third occupancy monitoring module 100*c*, which is received at the first occupancy monitoring module 100*a*. Retransmission of this information by the first occupancy monitoring module 100*a* is further received at user device 612 via a direct low-energy transmission. The user device further updates its occupancy status entry within list 672 accordingly.

Figure 20:
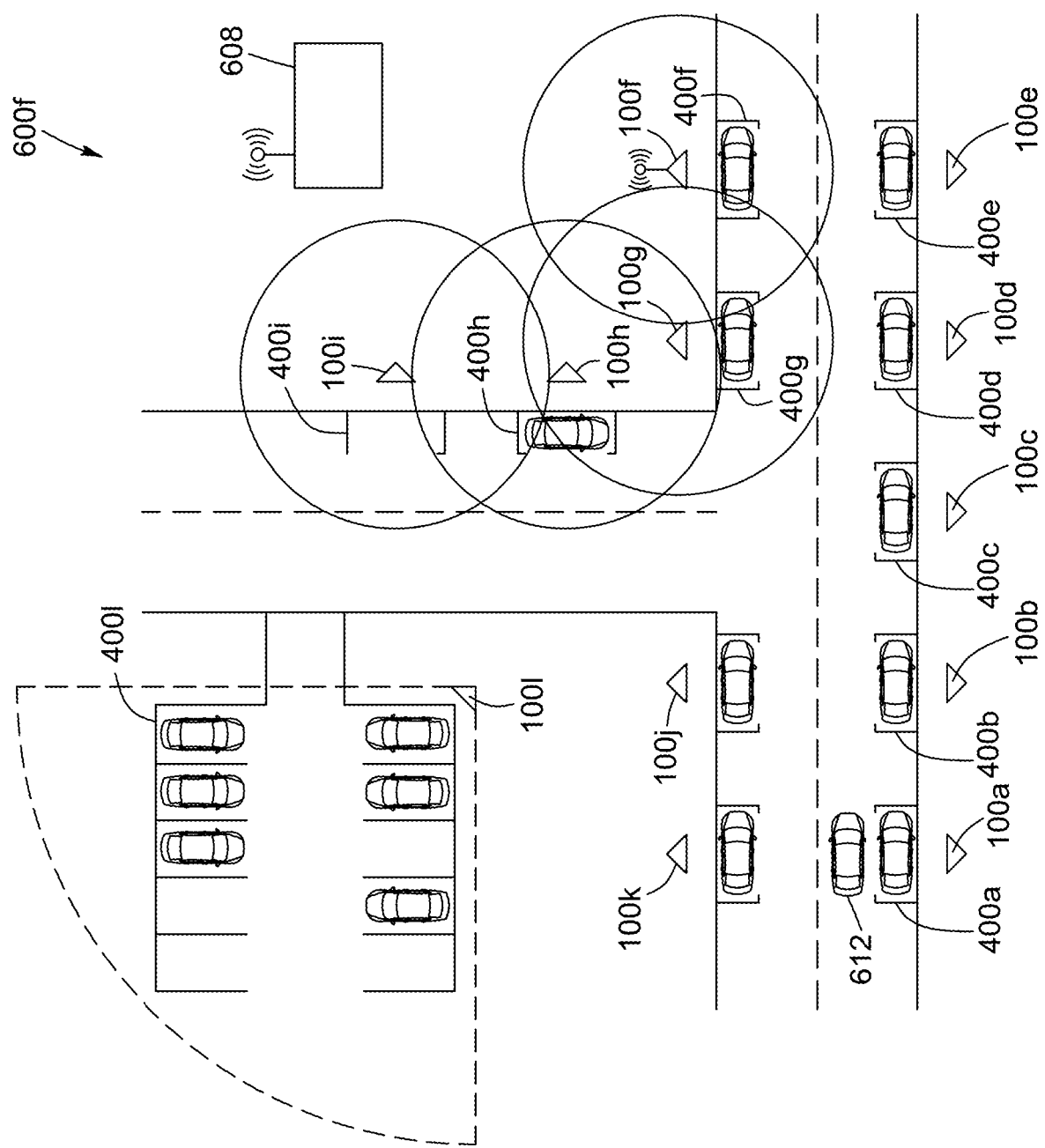
FIG. 20 illustrates a schematic diagram of an operating environment in which a plurality of occupancy monitoring modules are deployed according to a fifth example embodiment of a occupancy monitoring system.

Referring now to FIG. 20, therein illustrated is a schematic diagram of an operating environment in which a plurality of occupancy monitoring devices 100*a* to 100*k* are deployed according to a sixth example embodiment of an occupancy monitoring system 600*f*. FIG. 20 is similar to FIGS. 12, 14, 16, 18 and 20 described above in that a plurality of occupancy monitoring module 100*a* to 100*k* (and optionally 100*l*) are deployed within the operating environment to monitor the occupancy of an automobile at a respective one of a plurality of parking spots 400*a* to 400*k* (and optionally 400*l*) and each occupancy monitoring module is associated to the location at which it is deployed.

The occupancy monitoring modules are connected in a mesh network in which a status and ID message transmitted from a given occupancy monitoring module is repeated and relayed by other occupancy monitoring modules so that the message is flooded or propagated throughout the occupancy monitoring modules within the operating environment, as described herein with reference to FIG. 18.

At least one of the occupancy monitoring modules includes a communication submodule that is configured to transmit data in a long-range communication mode and/or over a wide-area network. More particularly, the occupancy monitoring module is configured to retransmit status and ID messages that it receives from other occupancy monitoring module, the retransmission being received at the central monitoring device 608. Accordingly, the central monitoring device 608 can receive occupancy status information for a set of a plurality of occupancy monitoring module via a communication link with a single occupancy monitoring module that is capable of communication over the wide-area network and that is assigned to that set. A user device may further connect to the central monitoring device 208 to receive occupancy status information for the set of occupancy monitoring modules.

In the example illustrated in FIG. 20, an automobile having a user device 612 is located within the operating environment. An occupancy monitoring module 100*f* that is out of low-energy transmission range of the automobile is equipped with a communication submodule that is configured to transmit and retransmit status and ID messages to the central monitoring device 608. In the illustrated example, the occupancy monitoring module 100*f* is within a mesh network that includes occupancy monitoring modules 100*g*, 100*h* and 100*i*. Occupancy status information for occupancy monitoring modules 100*g*, 100*h* and 100*i* are retransmitted by the occupancy monitoring module 100*f* to the central monitoring device 608. The user device 612 can further receive this occupancy status information over the wide-area network from the central monitoring device 608. This configuration of the system may be useful to limit the number occupancy monitoring modules within each mesh network (ex: to avoid collisions) while still permitting a user device to receive information even though it is not within low-energy transmission mode of one of the occupancy monitoring modules of the mesh network.

Figure 21:
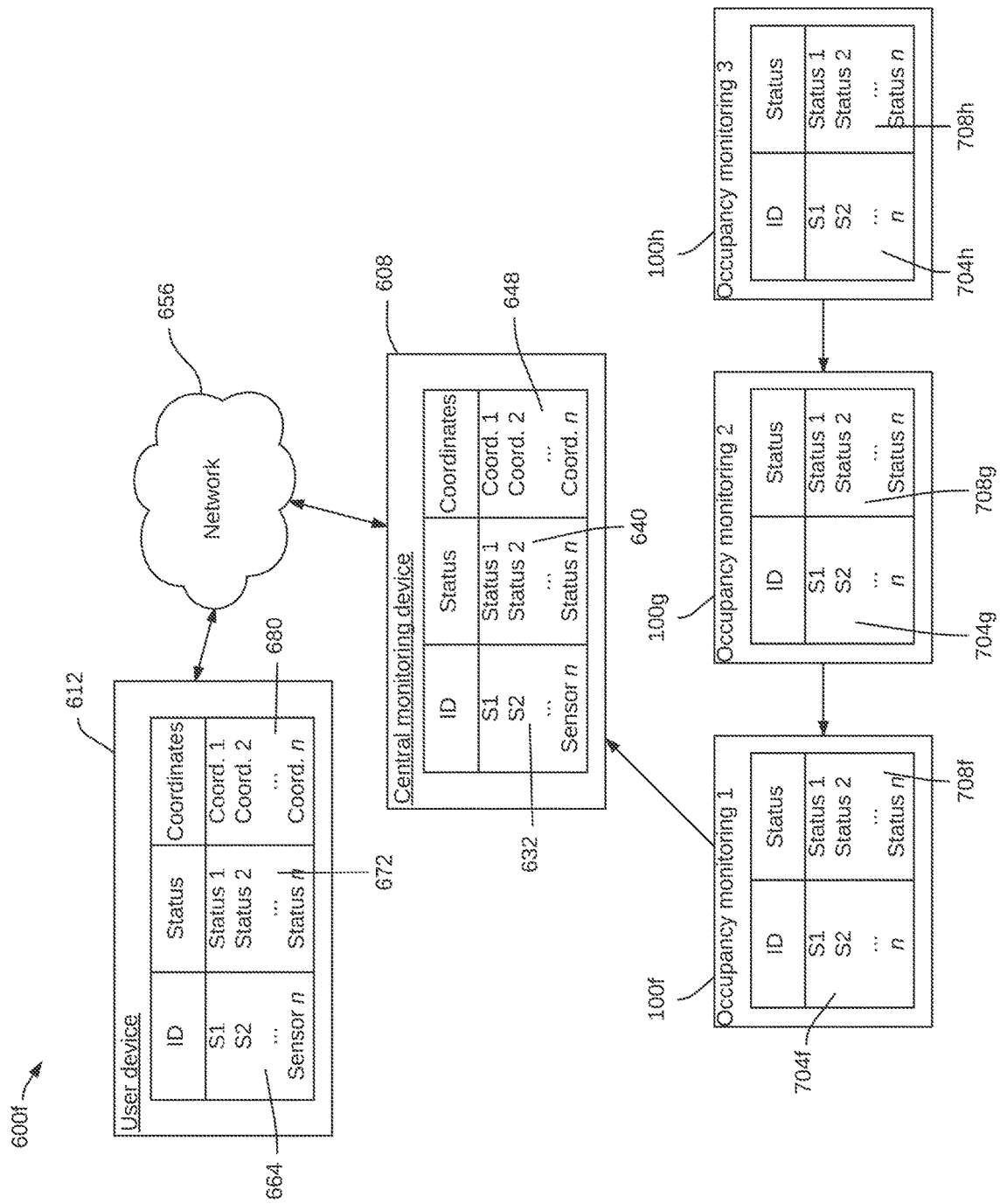
FIG. 21 illustrates components of the occupancy monitoring system according to the fifth example embodiment.

Referring now to FIG. 21, therein illustrated is a schematic diagram of the operational information stored at and communicated between the occupancy monitoring modules 100, central monitoring device 608 and user device 612 within the sixth example embodiment of the occupancy monitoring system.

In one example embodiment, each occupancy monitoring module has stored thereon a respective unique ID entry and a respective occupancy status entry denoting whether the occupancy sensor 116 of the occupancy monitoring module 100 senses an occupancy within the location associated to that occupancy monitoring module.

Alternatively, and as illustrated, each occupancy monitoring module has stored thereon a list of unique ID entries that includes its own unique location identifier as well as the unique location identifiers for other occupancy monitoring modules. For example, a first occupancy monitoring module 100*a* has a first list 704*a* of unique location identifier entries and a first list 708*a* of occupancy status entries for the unique location identifier entries, a second occupancy monitoring module 100*b* has a second list 704*b* of unique location identifier entries and a second list 708*b* of occupancy status entries for the unique location identifier entries, and a third occupancy monitoring module 100*c* has a third list 704*c* of unique location identifier entries and a third list 708*c* of occupancy status entries for the unique location identifier entries.

As illustrated, the second occupancy monitoring module 100*b* is within low-energy transmission range of the third occupancy monitoring module 100*c* and directly receives status and ID messages therefrom. Upon receiving the message, the second occupancy monitoring module 100*b* updates its status entry within list 708*b* for the third occupancy monitoring module 100*c*. The second occupancy monitoring module 100*b* then retransmits the occupancy status entry for the third occupancy monitoring module 100*c*, which is received at the first occupancy monitoring module 100*a*. The first occupancy monitoring module 100*a* then transmits the occupancy status for itself as well as for the second and third occupancy monitoring modules 100*b* and 100*c* to the central monitoring device 608. The information stored at the central monitoring device 608 (list 664 of unique location identifier entries, list 672 of the sensor status entries associated to that unique location identifier, and list 680 of coordinates of the location associated to the occupancy monitoring module corresponding to each unique location identifier entry) is updated accordingly. The updated information may be further received at the user device 612 over the wide area network 656 to further update lists 672 stored at the user device 612.

Figure 22:
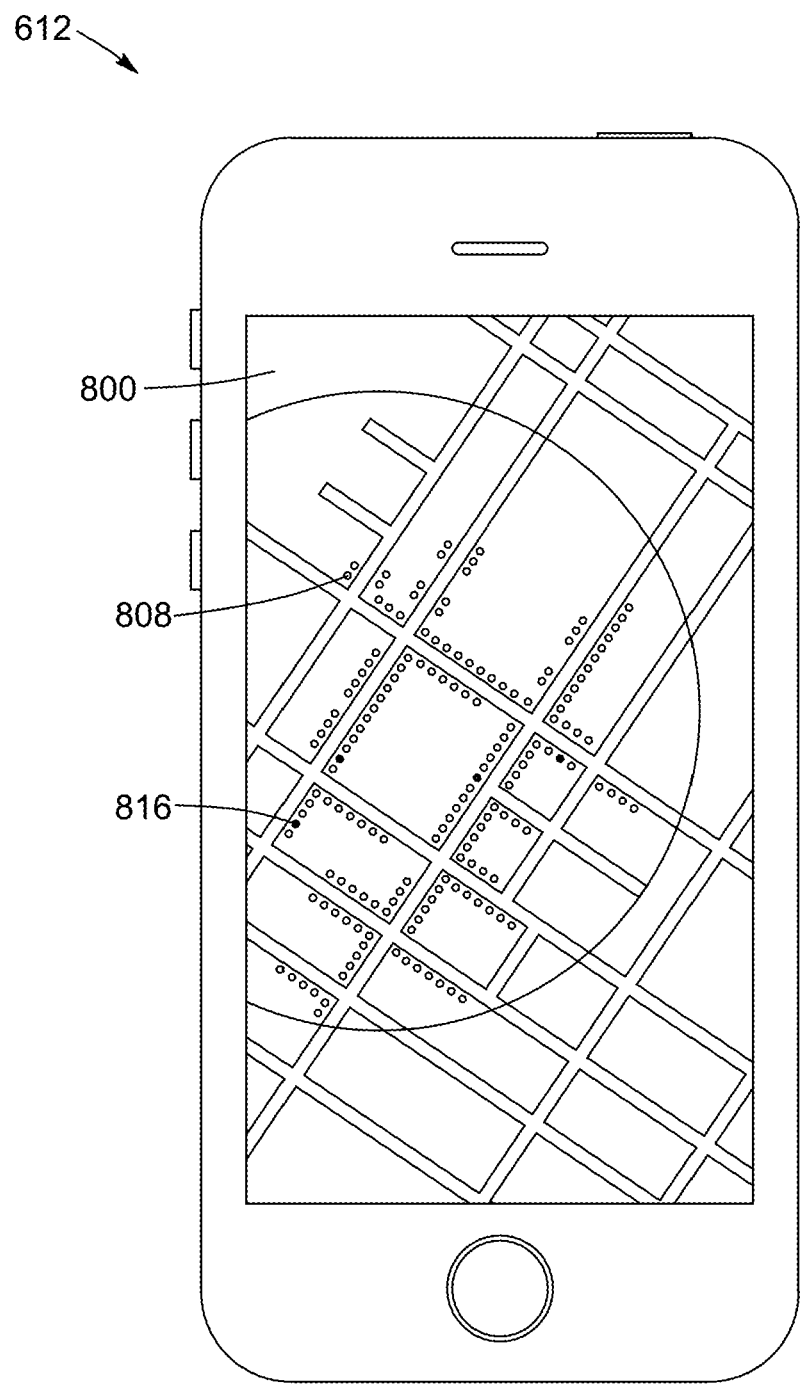
FIG. 22 illustrates a user interface presented on a display device according to an example embodiment.

As described herein, the information stored on a user device 612 may be displayed graphically on a display device of the user device. Referring now to FIG. 22, therein illustrated is an example of a user interface presented on a display device of a user device 164. As illustrated, the graphical representation shows a map in which a current location of the user device 612 (such as acquired by a GPS module of the user device 612) is shown as graphical indicator 800. Nearby location that is being monitored by a respective occupancy monitoring module 100 are illustrated as indicators 808 and 816 depending on their current occupancy status. For example, an available parking space is indicated with first indicator 808 of a first color and an occupied parking space is indicated with a second indicator 816 having a different color. Using this visual representation, a user can navigate to the desired parking space that is currently available. As further occupancy status information is received at the user device 612 according to various example embodiments described herein, the graphical indicators on the interface are updated to reflect any change.

While various example embodiments have been described herein with reference to FIGS. 1 to 22, it will be understood that functionalities from more than one embodiment may be combined within a single occupancy monitoring system deployed within an operating environment. For example, a user device 612 may directly receive status and ID messages in the low energy communication mode while antennas 204 are also be deployed within the operating environment to receive status and ID messages and retransmit the messages to the central monitoring device 208.

For example, within the same operating environment, some occupancy monitoring modules may be interconnected as a mesh network while other transmissions from other occupancy monitoring modules are received at one or more antennas in communication with the central monitoring device.

It will be appreciated that various example embodiments allow a user device to receive occupancy information for a plurality of locations (ex: availability of parking spaces) without requiring access to the wide-area network. This may be advantageous where access to the wide-area network is costly (ex: internet data plan for a smartphone may be costly) or the user device is not equipped to access the wide-area network in all areas (ex: a device that is only wi-fi enabled, but does not have 3G/4G/LTE access). As described, by directly receiving status and ID messages in the low-energy transmission mode, wide-area network is not required. In the case of the occupancy monitoring modules being set up as a mesh network, the user device is further able to receive occupancy status for occupancy monitoring modules that are not within low-energy transmission range.

It will be also appreciated that the various example embodiment allows installation of the occupancy monitoring system with low invasiveness. Since the occupancy monitoring modules are battery powered and communication wirelessly, wires do not need to be connected to the occupancy monitoring modules. Furthermore, by operating in a low-energy communication mode and throttling the number of status and ID messages transmitted, an occupancy monitoring module may operate for an extended amount of time (ex: 6 months to 1 year) without requiring battery change. Moreover, the occupancy monitoring system is easily scalable in that additional occupancy monitoring devices can be added to monitor occupancy of other locations with little reconfiguration (ex: requiring only updating lists of unique location identifiers and coordinates stored at the user devices and at the central monitoring device).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A multi-location occupancy monitoring device comprising:
    an occupancy sensor configured to detect the occupancy of a vehicle within each of a plurality of parking spaces;
    a communication submodule configured to transmit in a wireless communication mode, for each of the plurality of parking spaces, a status of the detected occupancy for the given parking space and an unique location identifier of the given parking space;
    a battery powering the occupancy sensor and the communication submodule; and
    an enclosure apparatus having:
        a sealed housing portion housing the occupancy sensor and the communication submodule; and
        at least one attachment mechanism configured for attaching the sealed housing portion to a raised location having a height of at least 5 meters.

2. The occupancy monitoring device of claim 1, wherein the occupancy sensor comprises an image capture device having a field of view encompassing the plurality of parking spaces and an image processor configured for analyzing images captured by the image capture device to determine the occupancy of a vehicle within each of a plurality of parking spaces.

3. The occupancy monitoring device of claim 2, wherein the image capture device comprises an infra-red sensor.

4. The occupancy monitoring device of claim 1, wherein the raised location is one of a street light, a lamp-post and a side of a building.

5. The occupancy monitoring device of claim 1, wherein the wireless communication mode is one or more of cellular communication, Wi-Fi and low-rate wireless personal area network.

6. The occupancy monitoring device of claim 1, wherein at least one solar panel is positioned over a surface of the enclosure for capturing solar rays for recharging the battery.

7. The occupancy monitoring device of claim 1, wherein at least a portion of the enclosure is permeable to signals received by the occupancy sensor.

8. The occupancy monitoring device of claim 1, wherein the image capture device has a field of view of approximately 90 degrees or greater.

9. A system for providing information relating to physical occupancy of a vehicle at each of plurality of parking spaces, the system comprising:
 a plurality of multi-location occupancy monitoring devices according to claim 1; and
 a central monitoring device configured to receive, for each of the plurality of multi-location occupancy monitoring devices, the status of the detected occupancy and unique location identifier for each of the plurality of parking spaces monitored by the multi-location occupancy monitoring device.

10. The system of claim 9, wherein the central monitoring device and the plurality of multi-location occupancy monitoring devices have a point-to-multipoint communication configuration.

11. The system of claim 9, wherein the central monitoring device is further configured to make available the statuses of the detected occupancy for the parking spaces monitored by the plurality of multi-location occupancy devices to one or more user devices over a wide-area network.

12. The system of claim 11, wherein the central monitoring device further stores a unique set of location coordinates for each of the unique location identifiers of the parking spaces monitored by the plurality of multi-location occupancy monitoring devices and the central monitoring device is further configured to make available the set of location coordinates to one or more user devices over a wide-area network.

13. The system of claim 9, further comprising:
 at least one retro-fit occupancy monitoring device each being positioned in proximity of a respective parking space, the retro-fit occupancy monitoring device comprising:
  an occupancy sensor configured to detect the occupancy of a vehicle within the respective parking space;
  a communication submodule configured to transmit in a wireless communication mode a status of the detected occupancy and an unique location identifier of the retro-fit occupancy monitoring device;
  a battery powering the occupancy sensor and the communication submodule; and
  an enclosure apparatus having:
   a sealed housing portion housing the occupancy sensor and the communication submodule; and
   at least one attachment mechanism configured for attaching the sealed housing portion to a pre-existing parking meter; and
 wherein the central monitoring device is further configured to receive, for each of the at least one retro-fit occupancy monitoring device, the status of the detected occupancy and the unique location identifier of the retro-fit occupancy monitoring device.

14. The system of claim 13, wherein the occupancy sensor of the at least one retro-fit occupancy monitoring device is a narrow-beam ultrasonic sensor configured to output an object detection indicator and a distance indicator of the distance of the object from the sensor; and
 wherein the retro-fit occupancy monitoring device further comprises a controller configured for:
  receiving the object detection indicator and the distance from the sensor; and
  determining a positive occurrence of occupancy if the distance of the object from the sensor is within a predetermined distance range defined by a near distance threshold and a far distance threshold; and
  determining a non-occurrence of occupancy if the distance of the object from the sensor is less than the near distance threshold or greater than the far distance threshold.

15. The system of claim 13, wherein the occupancy sensor of the at least one retro-fit occupancy monitoring device is a wide-beam sonar range sensor configured to output an object detection indicator and distance indicator of the distance of the object from the sensor; and
 wherein the retro-fit occupancy monitoring device further comprises a controller configured for:
  receiving the object detection indicator and the distance from the sensor; and
  determining a positive occurrence of occupancy if the distance of the object from the sensor is below a predetermined distance threshold; and
  determining a non-occurrence of occupancy if the distance of the object from the sensor is greater than the predetermined distance threshold.

16. A method for monitoring occupancy at a plurality of parking spaces, the method comprising:
 placing a multi-location occupancy monitoring device at a raised location having a height of at least 5 meters, the occupancy sensor having an occupancy sensor being oriented to detect the occupancy of a vehicle within each of a plurality of parking spaces;
 transmitting, in a wireless communication mode, a status of the detected occupancy and an unique location identifier for each of the plurality of parking spaces;
 receiving at a central monitoring device located remotely of the multi-location occupancy monitoring devices, the status of detected occupancy and the unique location identifier for each of the plurality of parking spaces; and
 making available the status of the detected occupancy for the parking spaces monitored by multi-location occupancy device to one or more user devices over a wide-area network.

17. The system of claim 13, wherein the occupancy sensor of the at least one retro-fit occupancy monitoring device is a radar sensor configured to output an object detection indicator.

18. A system for providing information relation to physical occupancy of a vehicle at each of a plurality spaces, the system comprising:

a plurality of multi-location occupancy monitoring devices each including:
  an occupancy sensor configured to detect the occupancy of a vehicle within each of a plurality of parking spaces;
  a communication submodule configured to transmit in a wireless communication mode, for each of the plurality of parking spaces, a status of the detected occupancy for the given parking space and an unique location identifier of the given parking space;
  a battery powering the occupancy sensor and the communication submodule; and
  an enclosure apparatus having:
    a sealed housing portion housing the occupancy sensor and the communication submodule; and
    at least one attachment mechanism configured for attaching the sealed housing portion to a raised location; and
a central monitoring device configured to receive, for each of the plurality of multi-location occupancy monitoring devices, the status of the detected occupancy and unique location identifier for each of the plurality of parking spaces monitored by the multi-location occupancy monitoring device;

wherein the central monitoring device is further configured to make available the statuses of the detected occupancy for the parking spaces monitored by the plurality of multi-location occupancy devices to one or more user devices over a wide-area network; and wherein the central monitoring device further stores a unique set of location coordinates for each of the unique location identifiers of the parking spaces monitored by the plurality of multi-location occupancy monitoring devices and the central monitoring device is further configured to make available the set of location coordinates to one or more user devices over a wide-area network.

* * * * *